(12) United States Patent
Simpson

(10) Patent No.: US 6,889,478 B1
(45) Date of Patent: May 10, 2005

(54) STANDING SEAM ROOF ASSEMBLY HAVING INCREASED SIDELAP SHEAR CAPACITY

(75) Inventor: Harold G. Simpson, Tulsa, OK (US)

(73) Assignee: Harold Simpson, Inc., Tulsa, OK (US)

( * ) Notice: Subject to any disclaimer, the term of this patent is extended or adjusted under 35 U.S.C. 154(b) by 207 days.

(21) Appl. No.: 09/978,262

(22) Filed: Oct. 15, 2001

Related U.S. Application Data

(63) Continuation-in-part of application No. 09/059,146, filed on Apr. 13, 1998, now Pat. No. 6,301,853, which is a continuation-in-part of application No. 08/484,975, filed on Jun. 7, 1995, now Pat. No. 5,737,894, and a continuation-in-part of application No. 08/480,968, filed on Jun. 7, 1995, now Pat. No. 5,692,352.

(51) Int. Cl.$^7$ ................................. E04D 1/00
(52) U.S. Cl. ..................... 52/520; 52/528; 52/545; 52/748.1
(58) Field of Search .................. 52/520, 528, 529, 52/545, 547, 748.1

(56) References Cited

U.S. PATENT DOCUMENTS

| | | | |
|---|---|---|---|
| 2,063,159 A | * | 12/1936 | Groove .................. 428/603 |
| 2,284,898 A | | 6/1942 | Hartman |
| 3,559,359 A | * | 2/1971 | Talbert .................. 52/394 |
| 3,583,121 A | | 6/1971 | Tate et al. |
| 3,740,917 A | | 6/1973 | Wong |
| 3,845,930 A | | 11/1974 | Metrailer |
| 3,998,019 A | | 12/1976 | Reinwall, Jr. |
| 4,099,357 A | | 7/1978 | Lester |
| 4,106,256 A | | 8/1978 | Cody |
| 4,133,161 A | | 1/1979 | Lester |
| 4,155,209 A | | 5/1979 | Schirmer |
| 4,213,282 A | | 7/1980 | Heckelsberg |
| 4,217,741 A | | 8/1980 | Cole |
| 4,269,012 A | | 5/1981 | Mattingly et al. |
| 4,314,428 A | | 2/1982 | Bromwell |
| 4,329,823 A | | 5/1982 | Simpson |
| 4,408,423 A | | 10/1983 | Lautensleger et al. |
| 4,522,005 A | | 6/1985 | Seaburg et al. |
| 4,528,789 A | | 7/1985 | Simpson |

(Continued)

*Primary Examiner*—Naoko Slack
(74) *Attorney, Agent, or Firm*—Bill D. McCarthy; Fellers, Snider, et al.

(57) ABSTRACT

A standing seam roof assembly in which adjacently disposed roof panels are supported by underlying support structure in overlapping edge relationship and connected with standing seams, the roof assembly resistant to sideslipping when subjected to uplift forces and having roof panels with female sidelap portions having male insertion cavities, while adjacently disposed roof panels having male sidelap portion lockingly engaged the female cavities. The sidelap shear capacity of the roof panels is increased in one embodiment by backer plates disposed in pairs on opposing sides of the standing seams and fastened together to sandwich together the female and male sidelap portions so the standing seams have increased resistance to side slipping under wind uplift. In another embodiment, cinch plates are supported on the roof panels between the standing seams and connected to an underlying backer member that extends to and is connected to the underlying support structure.

21 Claims, 29 Drawing Sheets

U.S. PATENT DOCUMENTS

| | | |
|---|---|---|
| 4,562,683 A | 1/1986 | Gottlieb |
| 4,597,234 A | 7/1986 | Simpson |
| 4,677,795 A | 7/1987 | Mathews et al. |
| 4,686,809 A | 8/1987 | Skelton |
| 4,694,628 A | 9/1987 | Vondergoltz et al. |
| 4,700,522 A * | 10/1987 | Simpson ..................... 52/528 |
| 4,706,434 A | 11/1987 | Cotter |
| 4,819,398 A | 4/1989 | Dameron |
| 4,870,798 A | 10/1989 | Richter |
| 4,987,716 A | 1/1991 | Boyd |
| 5,038,543 A * | 8/1991 | Neyer ........................ 52/528 |
| 5,142,838 A | 9/1992 | Simpson et al. |
| 5,201,158 A | 4/1993 | Bayley et al. |
| 5,241,785 A | 9/1993 | Meyer |
| 5,303,528 A | 4/1994 | Simpson et al. |
| 5,379,517 A | 1/1995 | Skelton |
| 5,524,409 A | 6/1996 | Kaiser |
| 5,737,894 A | 4/1998 | Simpson et al. |

* cited by examiner

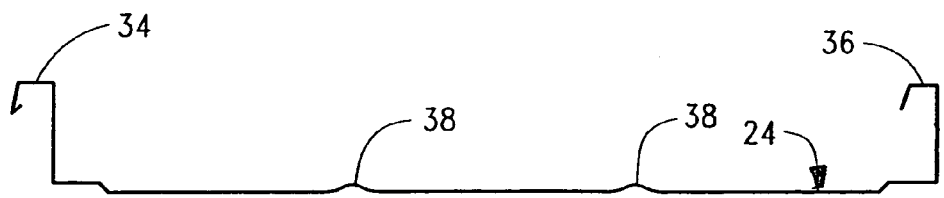
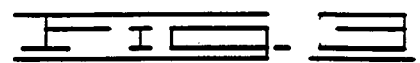
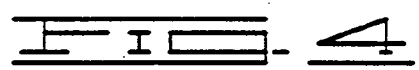
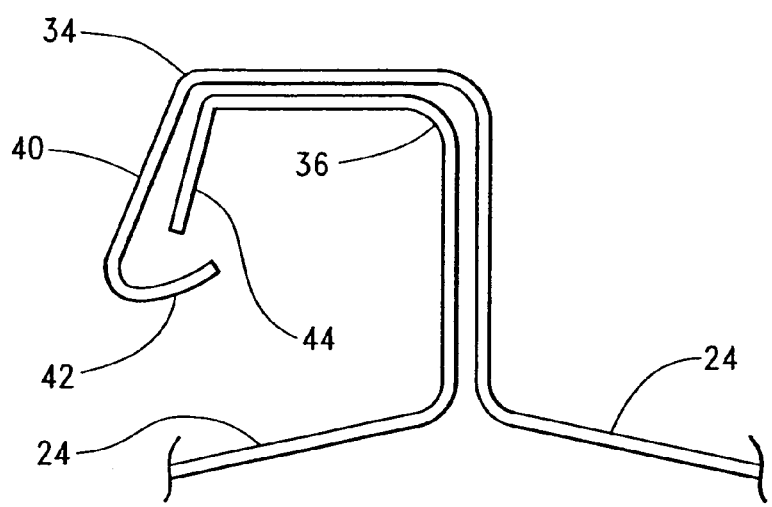
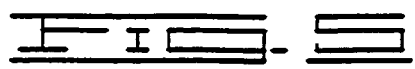

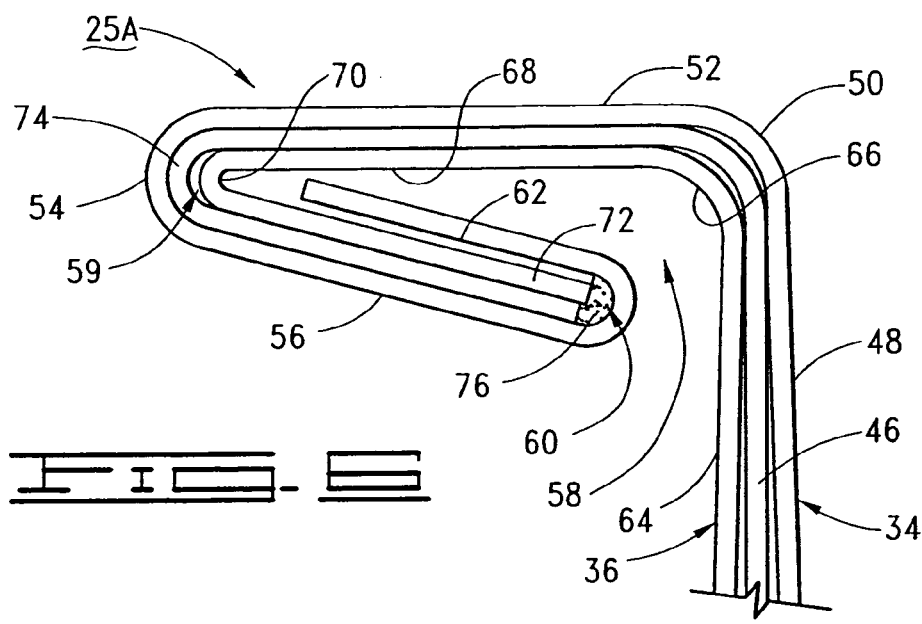
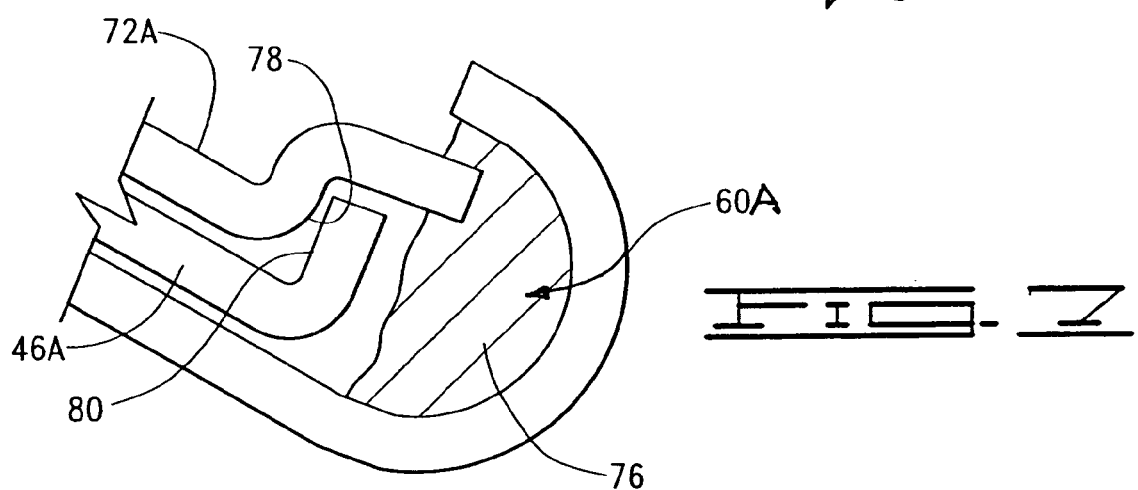
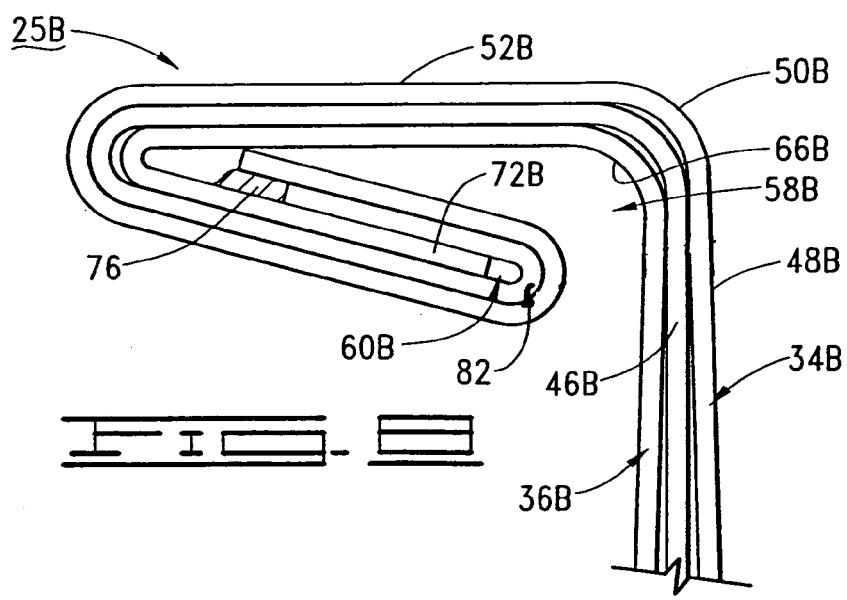

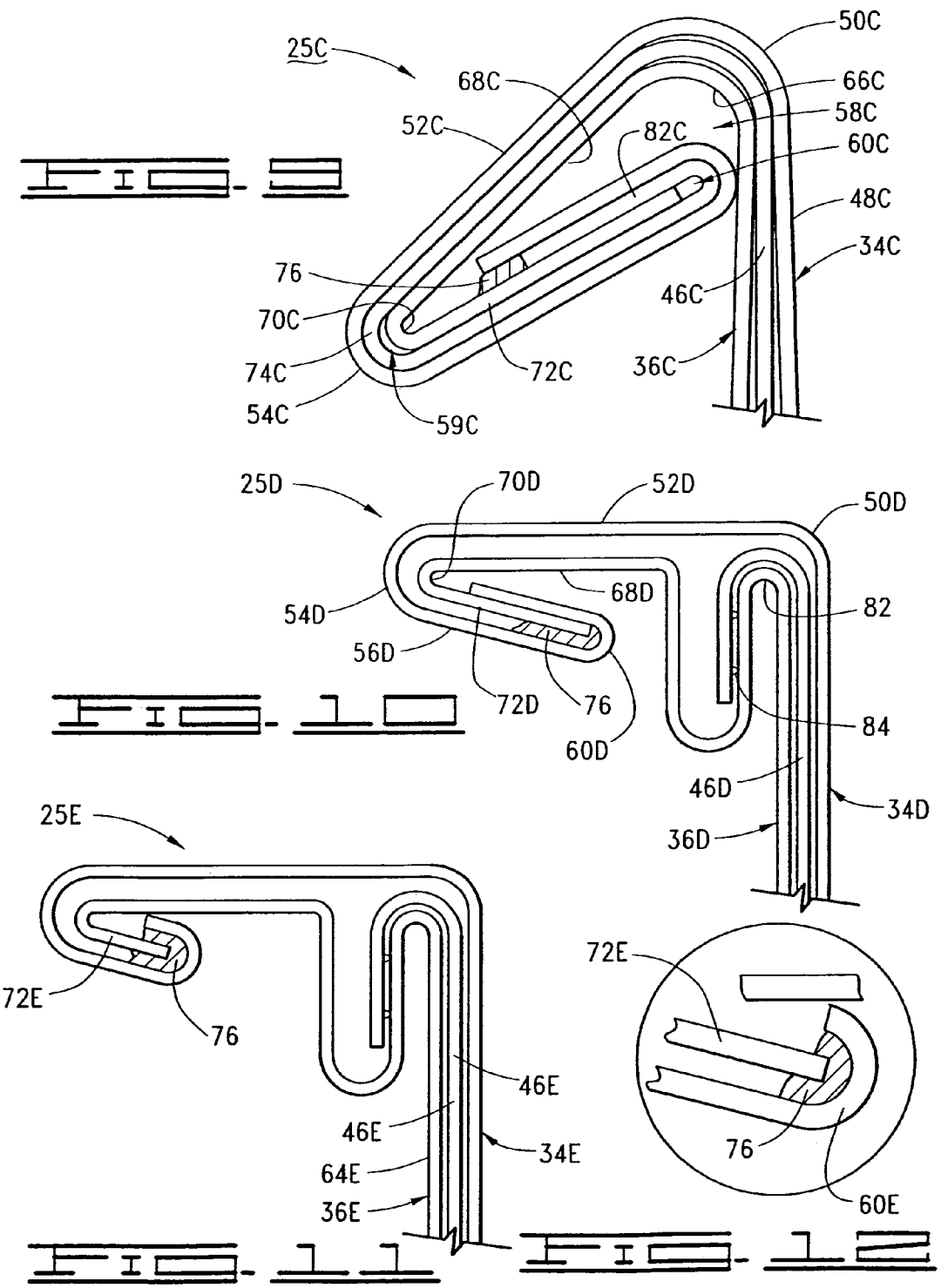

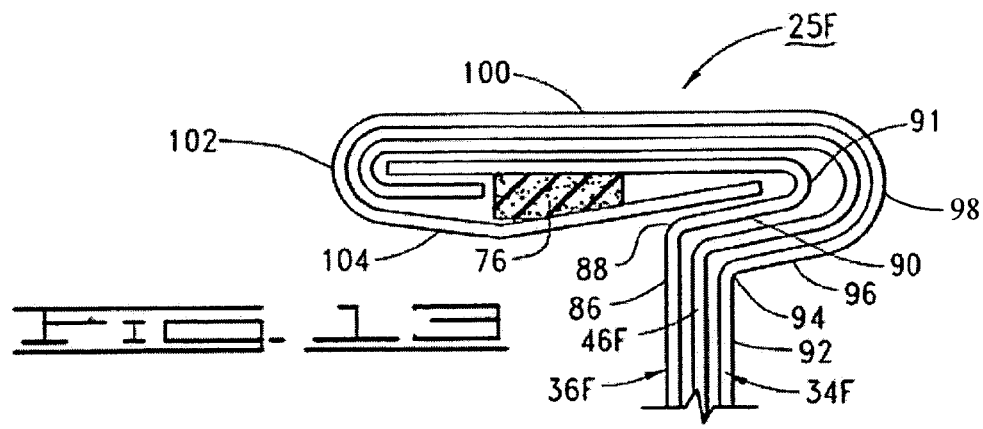
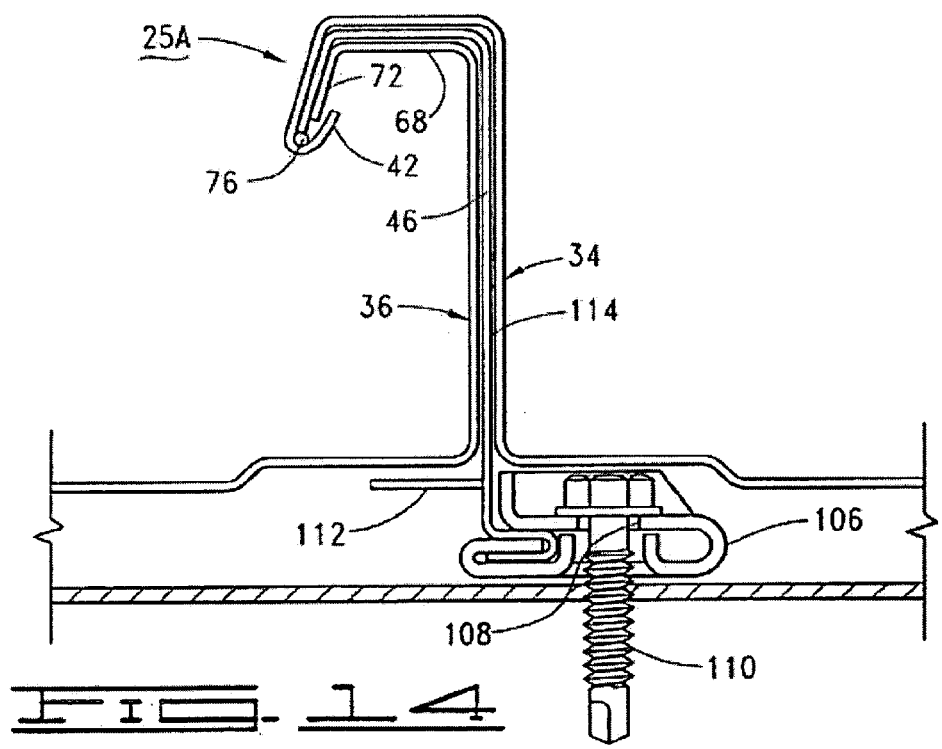
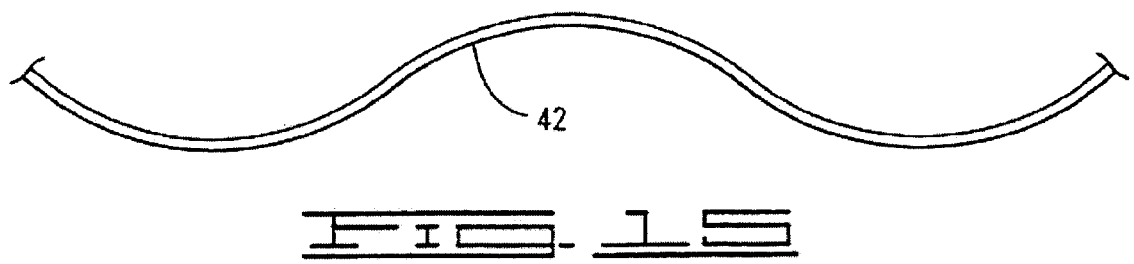

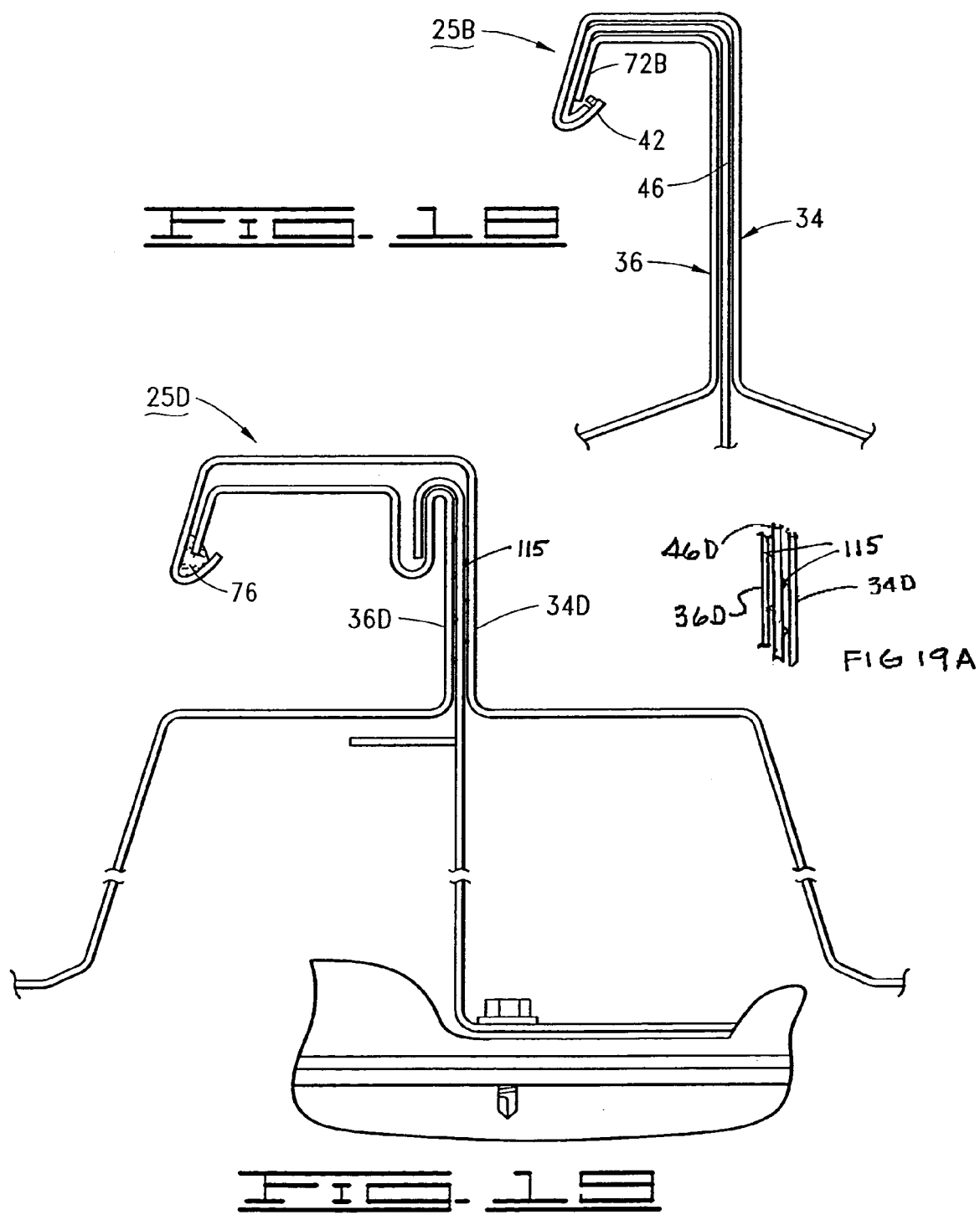

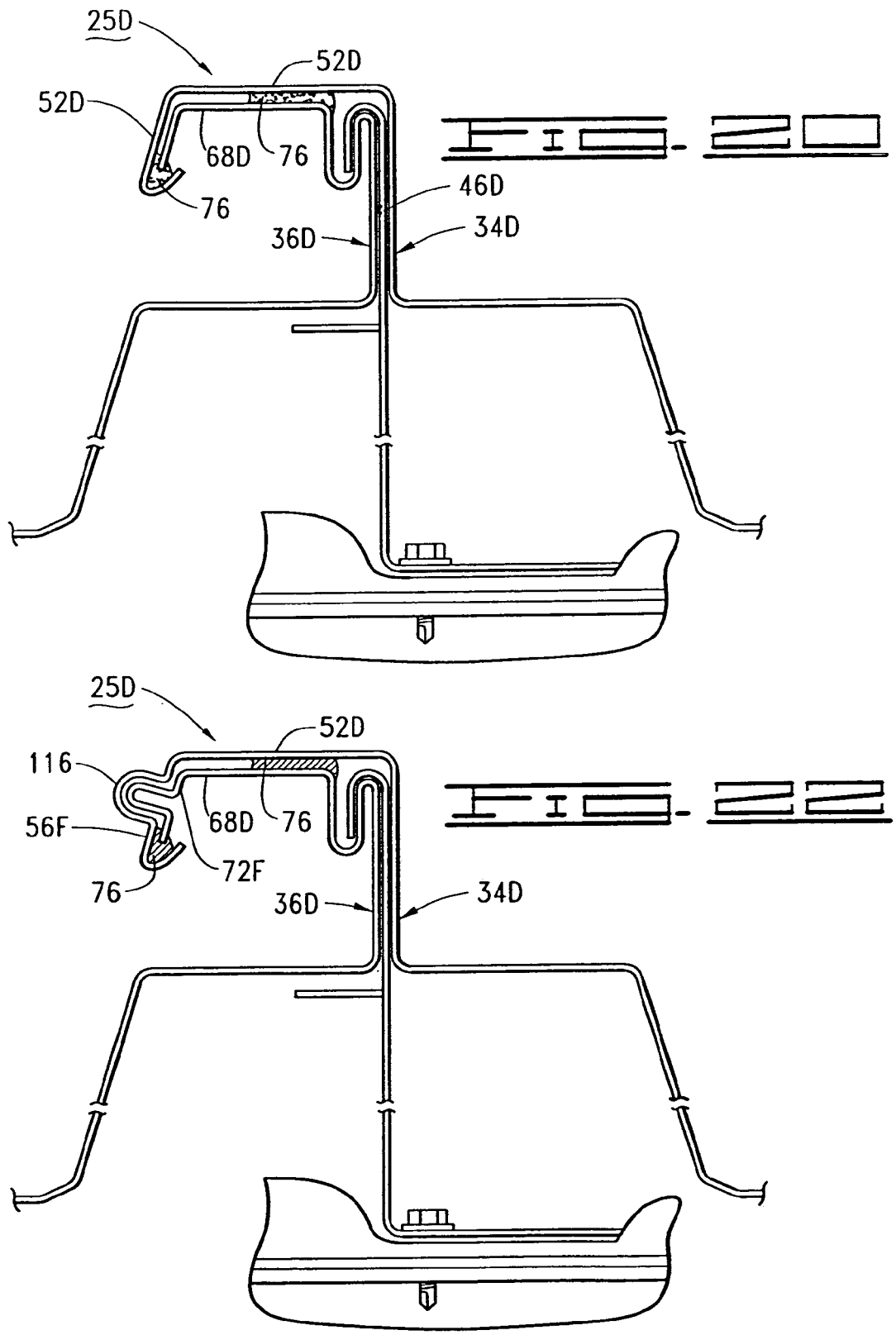

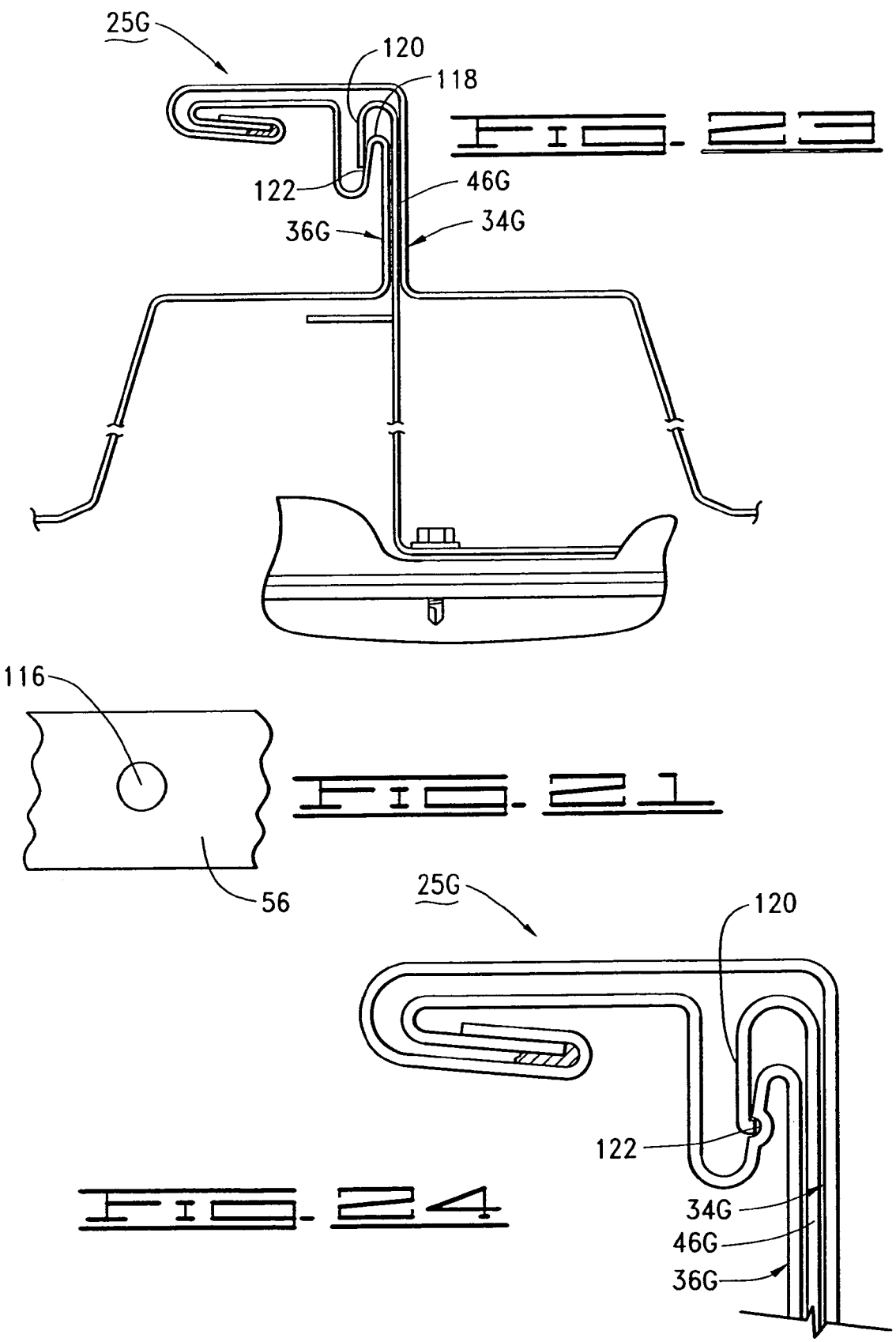

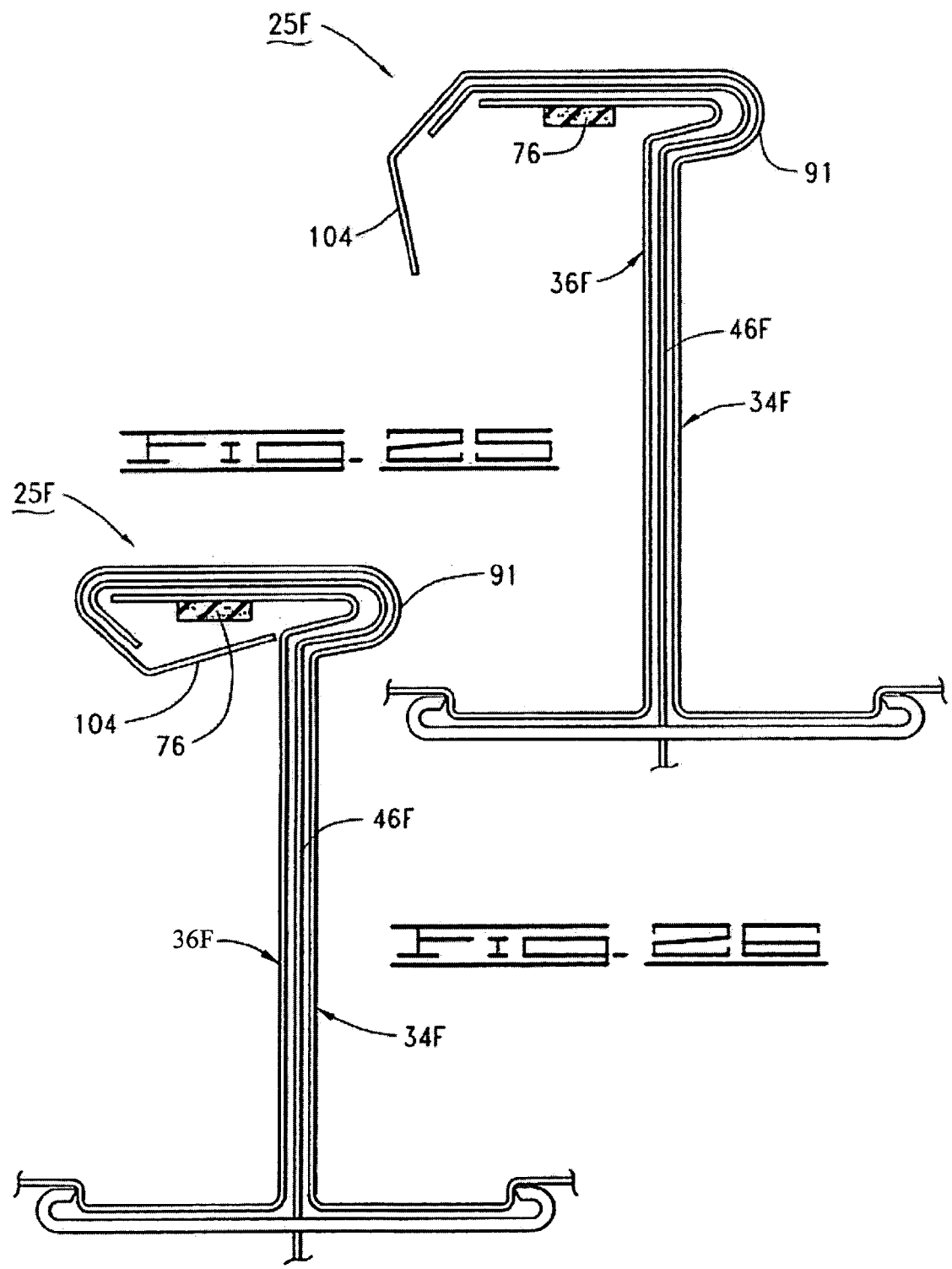

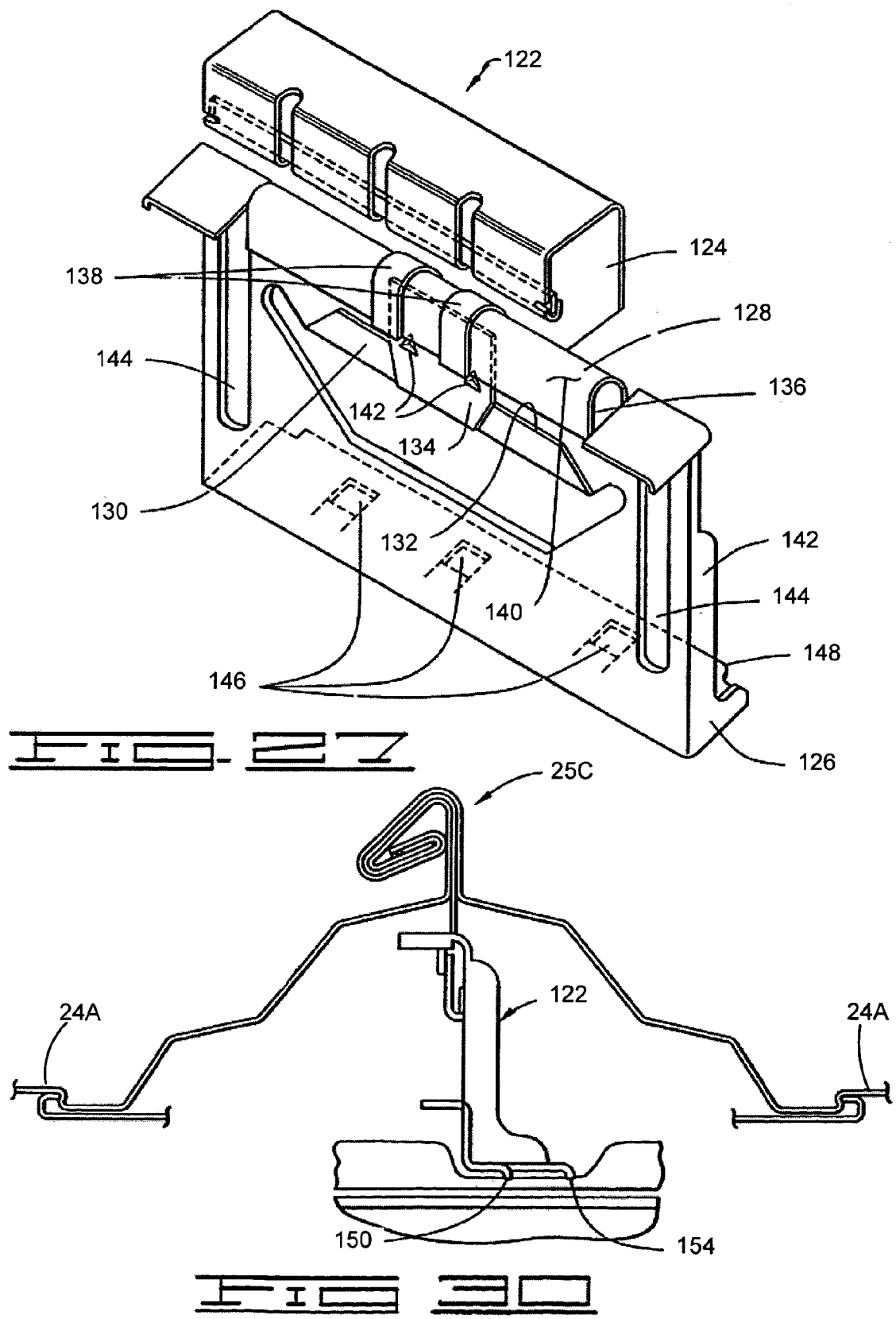

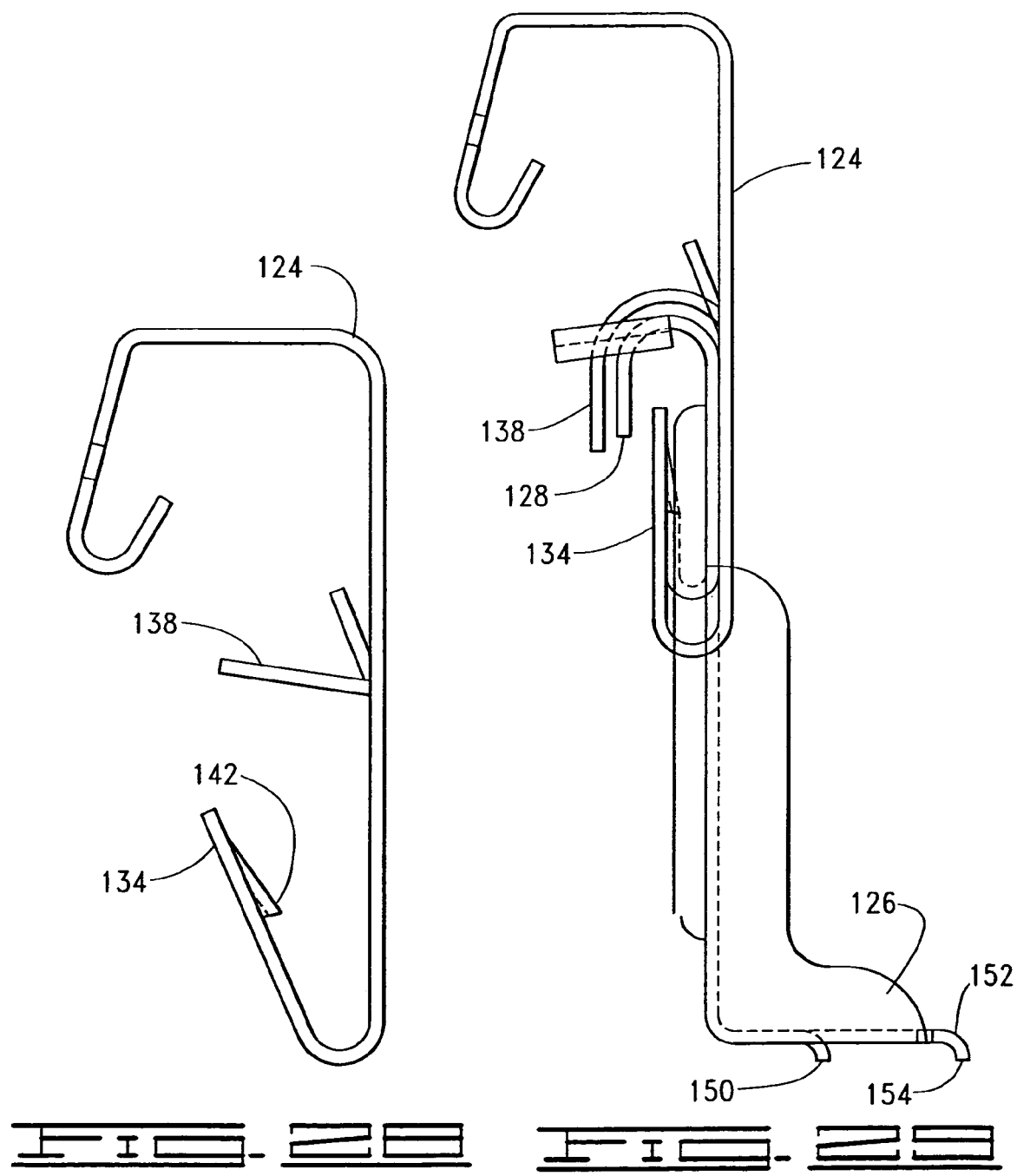

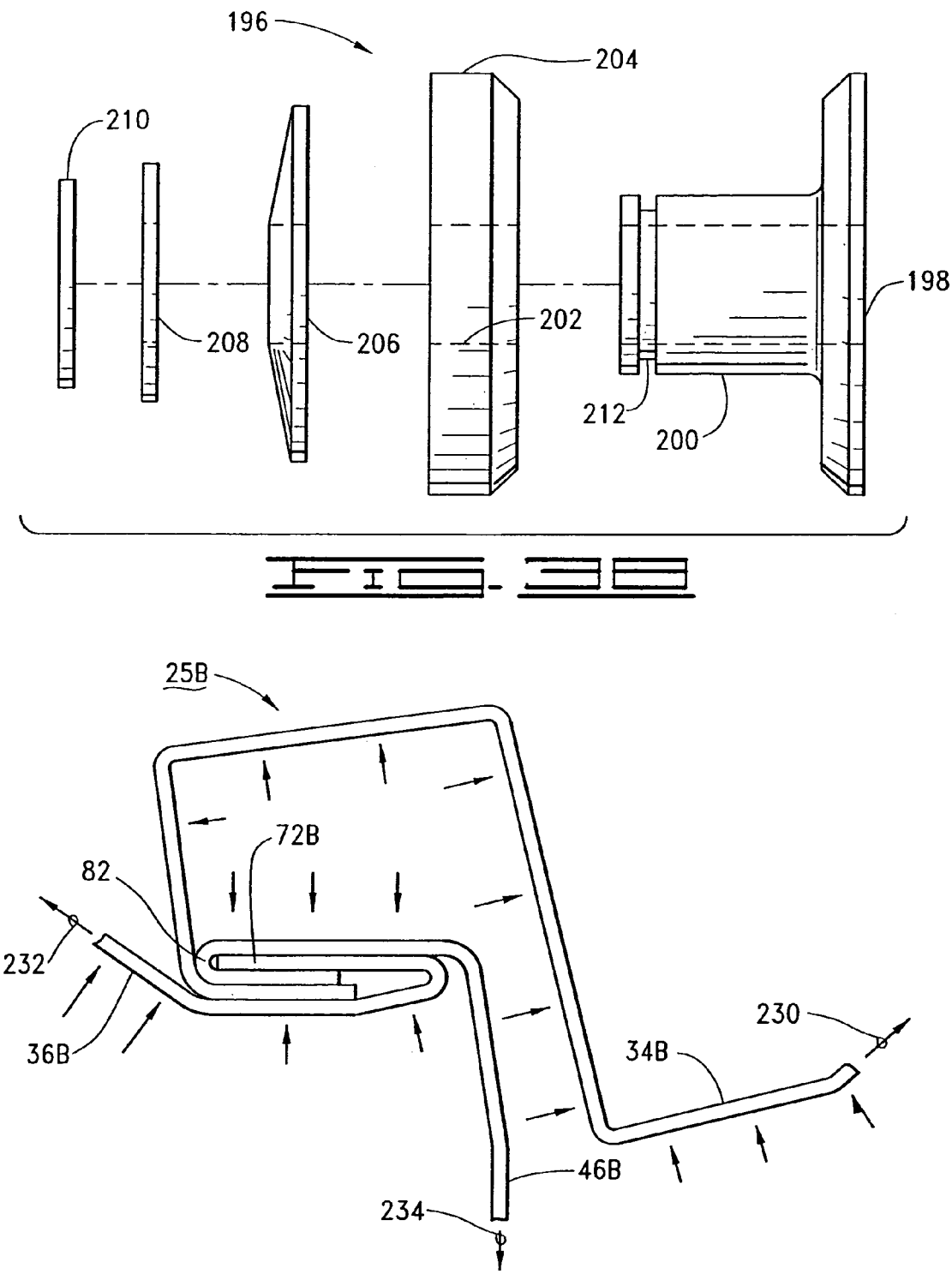

STANDING SEAM ROOF ASSEMBLY HAVING INCREASED SIDELAP SHEAR CAPACITY

Related Applications

This application is a continuation-in-part of U.S. patent application Ser. No. 09/059,146 filed Apr. 13, 1998, issued Oct. 16, 2001 as U.S. Pat. No. 6,301,853. U.S. Pat. No. 6,301,853 is a continuation-in-part of U.S. patent application Ser. No. 08/484,975 filed Jun. 7, 1995, issued Apr. 14, 1998 as U.S. Pat. No. 5,737,894; and of U.S. patent application Ser. No. 08/480,968 filed Jun. 7, 1995 and now U.S. Pat. No. 5,692,352 issued Dec. 2, 1997.

FIELD OF THE INVENTION

The present invention relates to a roof assembly for a building structure, and more particularly, but not by way of limitation, to standing seam roof systems.

BACKGROUND

Numerous types of roof assemblies have previously been proposed for pre-engineered buildings in efforts to provide a watertight roof assembly, while also enabling the roof assembly to expand and contract as changes in temperature are encountered. Typical of such prior art roof assemblies of considerable success in recent years is the standing seam roof assembly.

The panel members of the standing seam roof assembly are joined along lapped together side edges forming the standing seams. The panel members are secured to secondary structural members by either clips or through fasteners. The clips used to attach to the standing seam can be of two types: floating (one or two piece moveable); or fixed (one piece with no movement allowed between the panel and the supporting structure). Through fasteners penetrate the panels and attach the panels to underlying support structure to substantially lock the panels and support structure together so that differential movement is restricted. Roofs may be classified as shed roofs and low slope gasket roofs. Shed roofs are roofs that shed water because gravity pulls the water down and away from panel joints more effectively than wind or capillary action propel water thought the joint. Shed roofs generally occur over slopes of three to twelve or greater. Low slope gasket roofs, on the other hand, provide roof joints that are made watertight by placing gasket material between the panel joints and securing the gasket material in place by, for example, encapsulating or exerting pressure on the gasket material. Generally, low slope gasket roofs have a one to twelve or less slope.

Heretofore, field seamed gasket joints used on large roofs have generally been limited to using two-piece clips wherein movement between the roof and its underlying structure occurred within the clip. The reason for this is that, in the past, the line of sealant serving as the gasket and the top hook portion of the clip intersected, and if the clip hook moved in relation to the panel which held the sealant, the relative movement deformed and destroyed the gasket seal. One piece clips have been used freely in small and shed roofs where gasket sealing was not required.

Standing seam metal roof panels exhibit considerable diaphragm strength and it is desirable to use this strength by interconnecting the panels side to side so adjacent panels do not slide relative to each other and to connect the roof to the support frame to help stabilize the support frame, rather than to brace and stabilize the support frame by other means. Past practices have been to stabilize the support frame by means of separate bracing, and on gasket roofs, to use a suitable two-piece floating(moveable) clip to allow the brace and frame to remain fixed and for the panel to move in relation to the frame when subjected to temperature changes or other forces. Alternatively, the length of the panel run was limited to no more than about 40 feet so that the expansion and contraction of the panel does not damage the connection to the underlying support structure.

The desirable result of eliminating detrimental differential movement between the panel and support structure on large roofs can also be achieved by construction of the underlying support to move slightly to accommodate the expansion and contraction of the roof due to temperature changes or other forces. One such means of construction is exemplified by the Flex Frame™ support system produced by ReRoof America, Inc., Tulsa, Okla.

The interconnected panel members of the standing seam roof lend stiffness and strength to a flexible roof structure while allowing the roof structure to expand and contract as a function of the coefficient of expansion of the panel material and the temperature cycles of the roof panels.

If floating clips or flexible framing are not used, the repeated action of expansion and contraction of the panel member tends to weaken the panel-to-panel lap joints and the panel to framing connection, causing separation, structural failure and roof leakage. Leaks are generally caused by the weakening of the fastening members and working or kneading of the sealant disposed at the joints. Thus, prior art sealants for such roof assemblies have required the qualities of adhesion, flexibility and water repellence. Further, in many instances the pressure on the sealant can vary greatly throughout the length of the sidelap and end lap joints of the panels, resulting in uneven distribution and voids in the joint sealant.

Many of the problems encountered with prior art standing seam roofs, such as structural failures and leaks, are overcome by the standing seam floating roof assembly taught by U.S. Pat. No. 5,737,894 issued to Harold G. Simpson. The standing seam floating roof assembly is formed of elongated metal panels, each of which is provided with a female member formed along one longitudinal edge and a male member formed along the opposed longitudinal edge. Adjacently disposed panels are joined by interlocking female and male members to form the standing seam joint. Clips interconnect the standing seam joints and the supporting structure, with the upper portions of the clips hooking over the male members of the panels. Most such clips are of the sliding type which permit the hooking portions to move relative to supporting base portions connected to the supporting structure, while relative motion between the clip hooks and the metal panels is substantially prevented. A sealant material is disposed to form a moisture dam in the interlocking joints of the female and male members.

In addition to the use of standing seam roof assemblies on newly constructed pre-engineered buildings, standing seam roof assemblies are also finding increased usage in another segment of the roofing industry, that of built up roof replacement. Generally, a built-up roof is formed of a plurality of sections which are interconnected and over coated with asphaltic composition to provide a watertight seal. While such roofs have generally served successfully, problems have been encountered as built-up roofs age, when the buildings settle and when construction errors have resulted in standing water pockets. Standing water usually results in deterioration of the roof, resulting in leaks and other problems.

A need has long been recognized for replacing a roof without making substantial modifications to the existing roof. In addition to being economical fabrication and on-site construction, it is highly desirable that the new roof assembly be capable of providing a new roof surface independent of the variations in the surface of the preexisting roof. Past repair methods, especially those capable of altering the roof slope to improve drainage, are excessively time consuming and require substantial destruction of the original roof and extensive custom construction, thus exposing the building and its contents to damage by the elements during the reroofing process.

SUMMARY OF THE INVENTION

The present invention provides a standing seam roof assembly in which adjacently disposed roof panels are supported by an underlying support structure in overlapping edge relationship. The roof panels are connected along the overlapping edges that form standing seams, the roof panels female sidelap portions having male insertion cavities along one of the edges and male sidelap portions along the opposite edges that are lockingly engaged the female cavities, thereby forming the standing seams.

The sidelap shear capacity of the roof panels is increased in one embodiment by backer plates disposed in pairs on opposing sides of the standing seams and fastened together to sandwich together the female and male sidelap portions so the standing seams have increased resistance to side slipping under wind uplift.

In another embodiment, cinch plates are supported on the roof panels between the standing seams and connected to underlying backer members.

The features, benefits and advantages of the present invention will become apparent from the following detailed description when read in conjunction with the drawings and appended claims.

BRIEF DESCRIPTION OF THE DRAWINGS

FIG. 3 is an end view of the profile of a roof panel member which can be utilized in the roof system of FIGS. 1 and 2.

FIG. 4 is an end view of the profile of an alternative roof panel member which can be utilized in the roof system of FIGS. 1 and 2.

FIG. 5 is an end view of the profile of a portion of the male sidelap portion interlocked with a portion of the female sidelap portion of the roof panel members of FIG. 1 and FIG. 2.

FIG. 6 is an elevational view of the standing seam assembly between adjacent panels in the final formed configuration.

FIG. 7 is an elevational view of a portion of the standing seam assembly of FIG. 6, showing an alternative configuration of the male sidelap portion and the retaining clip.

FIG. 8 is an elevational view of an alternative preferred embodiment of the standing seam assembly of FIG. 6.

FIG. 9 is an elevational view of an alternative preferred embodiment of the standing seam assembly of FIG. 6.

FIG. 10 is an elevational view of an alternative standing seam assembly between adjacent panels in the final formed configuration to resist in plane shear movement.

FIG. 11 is an elevational view of an alternative preferred embodiment of the standing seam assembly of FIG. 10.

FIG. 12 is a detail view of a portion of the standing seam assembly of FIG. 11.

FIG. 13 an elevational view of an alternative standing seam assembly between adjacent panels in the final formed configuration.

FIG. 14 is an elevational view of an alternate standing seam assembly of FIG. 6 before the field seaming operation is performed.

FIG. 15 is an end view of a portion of the standing seam assembly of FIG. 6, showing a scalloping condition as a result of not pre-crimping the hook portion of the female sidelap portion.

FIG. 18 is an elevational view of the standing seam assembly of FIG. 8 and FIG. 9 before the field seaming operation is performed.

FIG. 19 is an elevational view of the standing seam assembly of FIG. 10 before the field seaming operation is performed. FIG. 19A is an enlarged portion of the standing seam assembly of FIG. 19.

FIG. 20 is an elevational view of an alternative embodiment of the seam of FIG. 10 before the field seaming operation is performed.

FIG. 21 is an elevational view of a portion of the female sidelap portion showing an alternative embodiment of the standing seam assembly of FIG. 19 wherein the female sidelap portion and the male sidelap portions are staked together to prevent sliding of one panel relative to the other.

FIG. 22 is an end view of the staking operation of FIG. 21.

FIG. 24 is a detail view of a portion of the standing seam assembly of FIG. 23.

FIG. 25 is an elevational view of the standing seam assembly of FIG. 13 prior to the field seaming operation.

FIG. 26 is an elevational view of the standing seam assembly of FIG. 13 at an intermediate configuration during the field seaming operation.

FIG. 27 is an isometric view of a two-piece roof clip assembly.

FIG. 28 is an end view of the hold down clip portion of the two-piece clip assembly of FIG. 27.

FIG. 29 is an end view of the two-piece roof clip assembly of FIG. 27.

FIG. 30 is an elevational view of the roof system of the present invention, employing the roof members of FIG. 4 attached to the underlying roof structure by the two-piece roof clip of FIG. 27.

FIG. 36 is an elevational view of the pre-crimping assembly of FIG. 34 for use on the standing seam assembly of FIG. 3, the pre-crimping assembly shown in a closed mode.

FIG. 37 is an elevational view of a pre-crimping assembly for use on the standing seam assembly of FIG. 4, the pre-crimping assembly shown in a closed mode.

FIG. 38 is an exploded view of the crimping roller assembly of the pre-crimping assembly of FIG. 37.

FIG. 45 is an elevational view of the standing seam assembly of FIG. 8 illustrating the standing seam assembly subjected to applied load forces.

DETAILED DESCRIPTION

Figure 1:
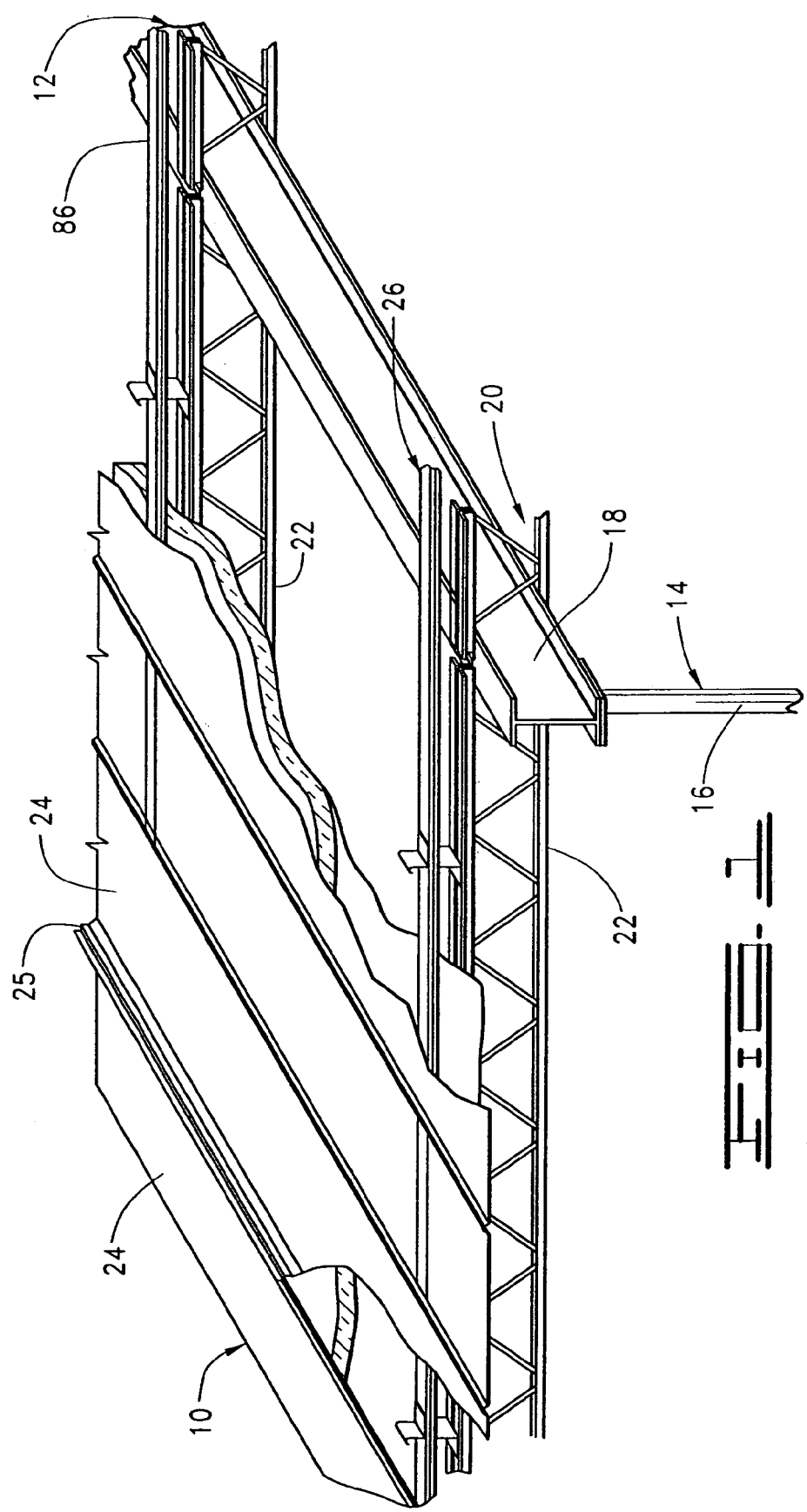
FIG. 1 is an isometric, partial cut-away view of a portion of a roof system utilizing the standing seam roof assembly of the present invention.

Referring to the drawings generally, and more particularly to FIG. 1, shown therein is a pre-engineered building roof 10 as supported by a pre-engineered building structure 12. The pre-engineered structure 12 comprises a primary structural system 14 which consists of a plurality of upwardly extending column members 16 that are rigidly connected to a foundation (not shown). Also, the primary structural system 14 has a plurality of generally sloping primary beams 18 which are supported by the column members 16.

A secondary structural system 20 comprises a plurality of open web beams 22, also called bar joists, supported by the primary beams 18 generally in horizontal disposition. It will be understood that cee or zee purlins, or wood beams, can be used as the secondary structurals in lieu of the bar joists 22 in the practice of the present invention.

A plurality of roof panels 24 are supported over the secondary structural assembly 20 by a plurality of panel support assemblies 26 and are attached to the upper flanges of the bar joists 22. The roof panels 24, only portions of which are shown, are depicted as being standing seam panels with interlocking standing seams 25 connected by clip portions of the panel support assemblies 26.

Figure 2:
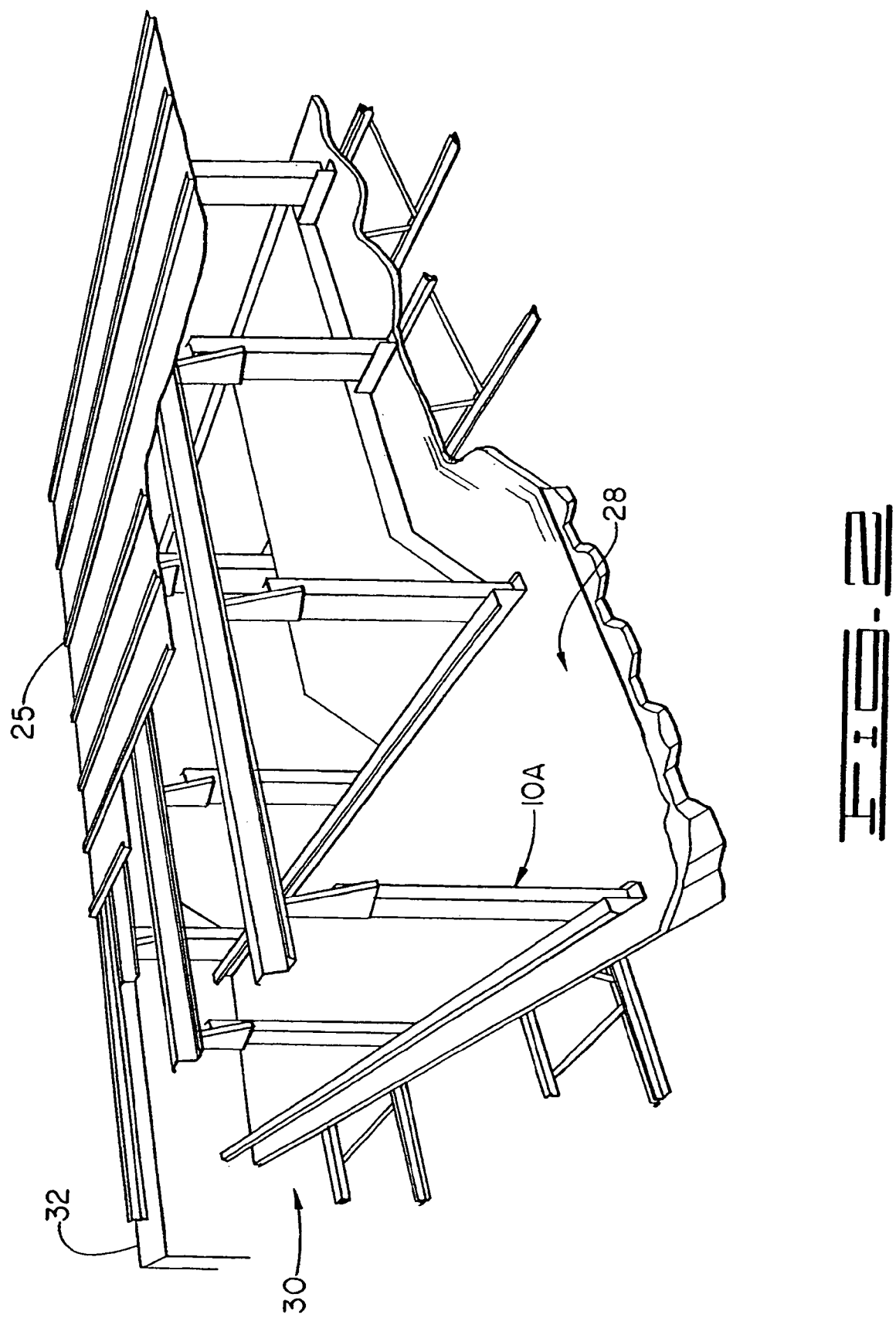
FIG. 2 is an isometric, partial cut-away view of a portion of a re-roof system 20 utilizing the standing seam roof assembly of the present invention.

The present invention can as well be supported above an existing roof in a re-roof installation. FIG. 2 shows a portion of a roof system 10A supported by a preexisting roof 28 of a building structure 30 and a plurality of wall members 32. The preexisting roof 28 can be any preexisting roof structure such as a built-up roof connected to and supported by conventional primary and secondary support elements.

Whether in a new roof as depicted in FIG. 1, or in a reroof as depicted in FIG. 2, the roof panels 24 are secured at the interlocking side lap joints and at the end overlap of contiguous panels. Fastener penetration of the roof panels 24, except at the end overlaps and roof perimeters, is avoided to minimize leakage points. To achieve water tightness at points of attachment to underlying structure, the roof panels 24 must be permitted to expand and contract in relation to the underlying structure, or the roof panels 24 and the underlying structure must be permitted to move in unison without unduly straining or fracturing the panels. This may be accomplished by limiting the length of the roof panels 24 or by utilizing support structures sufficiently flexible to allow the attachment means to move with the expansion and contraction of the panels. The flexibility of the support structural must be greater for longer panel runs because, other factors being equal, the expansion and contraction of the panels will be greater.

Past practice has been to attach the center and sidelap joints with either penetrating or non-penetrating fasteners. For non-penetrating clips, it has been common to use either a fixed or sliding clip with a minimum length contact surface between the hold-down portion of the clip and the top of the male leg of the seam. The length of the clip has been held to a minimum, resulting in stress concentrations in the panel at the point of attachment, leading to severe distortion in the panel joints as the panels are subjected to wind uplift.

In prior art standing seams, the standing seam clip bears only on the male seam portion of the panel inserted into the adjacent female seam portion. The female seam portion is not retained directly by the clip, and as a result, the load from the female seam portion must pass through the male seam portion and into the clip where the load can, in turn, pass to the secondary structural. This action tends to "unravel" or "unzip" the panel joint and allow distortions over the short section retained by the clip. This has resulted in premature panel failure when the panels incur wind uplift.

A roof panel is usually attached to underlying supporting structure in a manner that causes the panel to act as a three or four span continuous beam. This arrangement substantially reduces the maximum moment occurring at any one point compared to the moment that would occur in a simple beam, other factors being equal. However, this can cause a negative moment to occur at the attachment point. This negative moment peaks and drops off very quickly as the panel section moves from the center line of the attaching clip towards the point of inflection (P.I.), the P.I. being that point where the moment in the panel changes from positive to negative.

Past center hold-down practice has been to coordinate usage of floating clips with eave and ridge hold-down practice so that if floating clips were used to attach the center of the panel to the underlying structural, then fixed clips were used to attach the eave or ridge portions of the panel to the underlying structural; and conversely, if the panel edge attachment consisted of a floating, (two-piece, moveable) non-penetrating attachment means, such as a clip, then the center hold-down was a fixed attachment. However, past non-penetrating floating hold-down devices heretofore have largely been complex and expensive.

The effectiveness of non-penetrating center hold-down devices is influenced by the number and height of corrugations formed in the panel, and by the width, thickness and strength of the metal laterally separating the corrugations. The configuration and number of panel corrugations in turn has a direct impact on the efficiency of material utilization, which is a primary cost factor. Conventional standing seam roofs may only achieve a flat-width-to-coverage ration as low as 1.25:1 where through fasteners exist only at panel end laps and do not occur at the panel centers. On the other hand, non-standing seam panels with penetrating center hold-down fasteners are commonly 36 inches wide and may achieve flat-width-to-coverage ratios as low as 1.17:1 As shown in FIG. 3, the roof panel 24 has a substantially flat pan profile between a female sidelap portion 34 and a male sidelap portion 36. The medial portion of the roof panel 24 can have a number of corrugations 38 of a selected height for the purpose of stiffening the panel. FIG. 4 shows an alternative roof panel 24A having trapezoidal sidelap portions 34A, 36A to improve the panel material utilization in relation to roof coverage. That is, all else being equal, the roof panel 24 of FIG. 3 requires a wider metal blank sheet than does the roof panel 24A of FIG. 4.

Adjacent roof panels 24 are interlocked with the female sidelap portion 34 wrapped around the male sidelap portion 36, as shown in FIG. 5. It will be noted that the outwardly angled leg 40 is provided with a hook 42 at a distal end thereof for sliding engagement past a tang portion 44 of the male sidelap portion 36 as the two adjacent roof panels 24 are joined. In this manner, the panel profile of the present invention provides for an ease initially assembling and interlocking the male sidelap portion 36 with the female sidelap portion 34; that is, the female sidelap portion 34 can be dropped vertically onto the male sidelap portion 36. This provides a superior method of joining panels in comparison to the well known method of "roll-to-lock" wherein one panel must be rotated upwardly in order to interlock and then rotated downwardly into a final position.

It will be further noted that FIG. 5 shows the interlocked adjacent roof panels 24 in an unseamed condition; that is, mechanical seaming may be used to provide the final relationship between the male sidelap portion 36 and the female sidelap portion 34. In other words, to form a standing seam by pressing said leg 40 with hook 42 into mating contact with the tang 44, and folding the mated said leg 40 with hook 42 and tang 44 into adjacency with a fifth leg portion 68 of the male sidelap portion 36 of FIG. 6. An attachment clip can also be gripped between the male sidelap portion 36 and the female sidelap portion 34 for attachment to the underlying roof structure as will be discussed below.

Turning to FIG. 6, shown therein is the standing seam 25A, identical to the standing seam, described hereinabove, except that a roof clip 46 is sandwiched between the female sidelap portion 34 and the male sidelap portion 36, after which the standing seam 25A has been field formed by a seaming operation. The female sidelap portion 34 has a first leg portion 48, a first radiused portion 50, a second leg portion 52, a second radiused portion 54 and a third leg portion 56 which together form a first female cavity 58 and a second female cavity 59 (also sometimes herein referred to as the first and second male insertion cavities), for receiving the male sidelap portion 36. A retaining groove 60 is disposed at a distal end of the third leg portion 56, and an extended leg portion 62 extends from the third leg portion 56 to the retaining groove 60.

The male sidelap portion 36 has a fourth leg portion 64, a third radiused portion 66, the fifth leg portion 68, a fourth radiused portion 70 and a sixth leg portion 72, also referred to as the tang member 72, disposed in the female cavity 58. The radiused portion 70 is disposed in the second female cavity 59, and a distal end of the tang member 72 is disposed in the retaining groove 60.

The roof clip 46 is sandwiched between the female sidelap portion 34 and the male sidelap portion 36, having a radiused portion 74 that lockingly engages the fourth radiused portion 70 of the male sidelap portion 36 in the second female cavity 59, the roof clip 46 thereby attaching the male sidelap portion 36 to the underlying building structural system. The retaining groove 60 and the extended leg portion 62 of the female sidelap portion 34 lockingly engage the roof clip 46 which is retained thereby on the underlying building structural system. A mastic material 76 is disposed in the retaining groove 60 to sealingly engage the roof clip 46 and the tang member 72, thereby providing a watertight seal of the standing seam 25A.

In the installed mode of the standing seam 25A after field seaming, as depicted in FIG. 6, the standing seam 25A has a triple lock integrity. That is, the standing seam 25A formed by the interlocking engagement of the female and male sidelap portions 34, 36 is secured by the radiused portion 66 in the radiused portion 50; the radiused portion 70 in the radiused portion 54; and the locking tang 72 in the retaining groove 60. In addition to the aforementioned locking engagements of the standing seam 25A, the tang member 72 acts as a locking tab that engages the retaining groove 60 to resist unfurling or unzipping by uplift forces. As the panels forming the standing seam 25A are subjected to uplift forces, pivoting disengagement is attempted by the separation of these members, and as this occurs, the tang member 72 and retaining groove 60 permit some upward flexing of the adjacent roof panels 24 while maintaining the latching integrity of the sidelap portions 34, 36 and closure of the standing assembly 25A.

FIG. 7 shows a portion of an alteration to the standing seam 25A of FIG. 6, wherein the retaining groove 60 contains a mastic 76 but only the tang member 72A sealingly engages the mastic 76. The tang member 72A forms a shoulder 78 which pressingly engages an opposing shoulder 80 formed at the proximal end of the roof clip 46A. In this manner the roof clip 46A abuttingly engages the male sidelap portion 36A to provide a positive support thereof. The positive engagement of the roof clip 46A against the tang member 72A permits the standing seam assembly 25A to not require field seaming; that is, the retaining groove 60A can be preformed and the male sidelap portion 36A and the roof clip 46A simply formed together and placed into the retaining groove 60A. Such an assembly simplifies installation by reducing the field seaming operation to one simple bend of the assembly at radii 54, 70, and 74.

Another advantage is provided in that the roof-clip 46A does not engage the mastic 76, thereby allowing the roof clip 46A to float without disrupting the seal achieved by the mastic 76. The advantage of not sealingly engaging the roof clip 46A with the mastic 76 will become more apparent in the discussion of a two-piece roof clip 46 below.

FIG. 8 shows another embodiment with a standing seam 25B in which, like the standing seam 25A of FIG. 6, second leg portion 52B is substantially perpendicular to first leg portion 48B. Here, however, roof clip 46B has a retaining groove 82 which receives tang member 72B of male sidelap portion 36B, and wherein the retaining groove 82 is disposed in retaining groove 60B of female sidelap portion 34B. It will be noted that the mastic 76 is located at the ends of the female sidelap portion 34B and the roof clip 46B, as well as within the retaining groove 60B.

FIG. 9 shows another embodiment with a standing seam 25C wherein the standing seam 25B of FIG. 8 has been rotated or formed downwardly in the seaming operation to create an acute angle with respect to first leg portion 48C. This seam provides a tighter, stronger and more watertight seam because the over-bending requires a longer arc length for first radiused portion 50C which tends to draw retaining groove 60C more tightly against tang member 72C, as well as drawing radius portion 54C more tightly against radius portion 74C; that is more tightly than the retention groove 60B of FIG. 8 is drawn against tang member 72B of FIG. 8, and more tightly than radius portion 54 of FIG. 6 is drawn against radius portion 74 of FIG. 6. Drawing the retention groove 60C more tightly against tang member 72C, and radius portion 54C more tightly against radius portion 74C promotes a sidelap shear capacity for the standing seam 25C through increased frictional forces developed between the interacting members.

FIG. 9 further shows the roof clip 46C lies in pressing contact adjacent a first side of the tang member 72C, encloses the distal end of the tang member 72C, loops back on and pressingly engages a second side the tang member 72C to enclose substantially all of the tang member 72C. Whereas, the roof clip 46 of FIG. 6 pressingly engages only one side of the tang member 72 of FIG. 6. By enclosing substantially all of the tang member 72C in pressing engagement with the roof clip 46C, the surface area contact and frictional forces between the roof clip 46C and the tang member 72C is increased, and the sidelap shear capacity, imparted in the standing seam 25C through downwardly forming the standing seam 25B of FIG. 8, is increased through the resulting increased frictional force. That is, by enclosing a substantial part of the tang member 72C within the roof clip 46C, the sidelap shear capacity of the standing seam 25C is increased relative to a sidelap shear capacity attainable by downwardly forming the standing seam 25A of FIG. 6 to create an acute angle with respect to the first leg portion 48 of FIG. 6.

FIG. 10 is yet another embodiment with a standing seam 25D wherein roof clip 46D grips male sidelap portion 36D at a radiused portion 82 when the panel is subjected to uplift or diaphragm (shear loads in the plane at the roof between panels) loads. This separates the support of the roof clip 46D from the seamed portion so that the clip is not inserted in the sealingly engaged ends of female sidelap portion 34D and male sidelap portion 36D. The roof clip 46D can be provided a number of serrated teeth 84 to improve the gripping action on both the male sidelap portion 36D and female sidelap portion 34D to increase resistance to in plane panel sidelap shear or relative movement between adjacent panels.

The clip 46D provides several advantages. It is simple to manufacture, can be made from heavy stiff material and provides diaphragm strength between panels.

FIG. 11 shows another embodiment with a standing seam 25E which, like the standing seam 25D of FIG. 10, separates the engagement between roof clip 46E and male sidelap portion 36E from the sealingly engaged ends of male sidelap portion 36E and female sidelap portion 34E. This separation provides for transfer of uplift forces from the clip into the male seam as depicted in FIG. 12, wherein tang member 72E has a distal end disposed in the mastic material 72 disposed in retaining groove 60E, both of which move in unison as the panels expand and contract in relation to the clip.

All of the embodiments of the standing seams 25A–25E discussed above have a female sidelap portion 34 which forms a retaining groove 60 that lockingly engages a tang member 72 of the male sidelap portion 36. This engagement tends to drive the tang member 72 into ever more pressing engagement with the retaining groove as uplift forces tend to separate the first leg portion 48 of the female sidelap portion 34 from the fourth leg portion 64 of the male sidelap portion 36. The locking characteristic of this seam is not limited to seams having female sidelap portions which form the retaining groove 60, for an equivalent embodiment would be to have the male sidelap portion 64 form the retaining groove 60.

FIG. 13 shows one other embodiment with a standing seam 25F wherein male sidelap portion 36F has a first leg portion 86, a first radiused portion 88 and a second leg portion 90, wherein a distal end of the second leg portion 90 forms a retaining groove 91. The female sidelap portion 34F has a third leg portion 92, a second radiused portion 94, a fourth leg portion 96, a third radiused portion 98, a fifth leg portion 100, a fourth radiused portion 102, and a sixth leg portion 104, the sixth leg portion 104 sometimes referred to as the tang member 104 in the following. It will be noted that, as before, a mastic material 76 sealing engages the ends of the female sidelap portion 34F and the male sidelap portion 36F and a roof clip 46F has an end portion which wraps around the male sidelap portion 36F for locking engagement thereof.

In the seamed configuration shown in FIG. 13, the tang member 104 has an end portion disposed in the retaining groove 91 of the male sidelap portion 36F. Uplift forces which tend to separate the first leg portion 86 of the male sidelap portion 36F from the third leg portion 92 of the female sidelap portion 34F will drive the tab member 104 into ever more pressing engagement with the retaining groove 91, thereby resisting the unfurling or unzipping of the seamed joint. This will be discussed more fully below.

Having discussed the configuration of the characteristic locking engagement of the tang member and the retaining groove of the roof panel of the present invention, attention will now be directed to the method of field seaming the standing seam and of attaching the standing seam to the underlying roof structure 15.

FIG. 14 shows the standing seam 25A of FIG. 6 in an unseamed condition. During assembly, the roof clip 46 is placed over the male sidelap portion 36 and the female sidelap portion 34 is placed over both. In this manner, the hook 42 of the female sidelap portion 34 is deflected as it passes by the tang member 72 of the male sidelap portion 36 and is positioned there below. It will be noted the mastic material 76 is supported within the female sidelap portion 34 before field seaming.

The roof clip 46 in FIG. 14 is of a two-piece construction having an attachment end 106 with an aperture 108 through which a fastener 110 is attached in threading engagement with the underlying structure, such as in the attachment of the roof clip 46 to the panel support assembly 26 or directly to the bar joist 22. The roof clip 46 can be provided with a support shelf 112 for supporting the male sidelap portion 36 during the assembly and seaming of the standing seam 25A. Further, the roof clip 46 has an upstanding web portion 114 which supports the tang member 72 at an end portion thereof.

Figure 16:
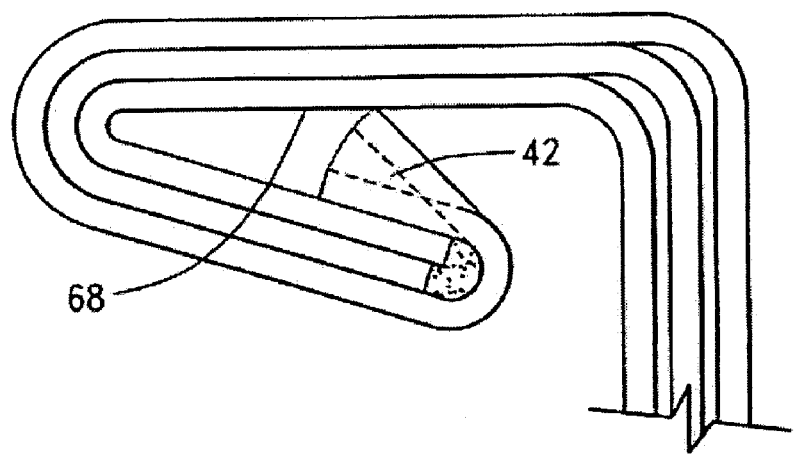
FIG. 16 is an end view of a portion of the standing seam assembly of FIG. 6, showing the scalloping condition of FIG. 15.
Figure 17:
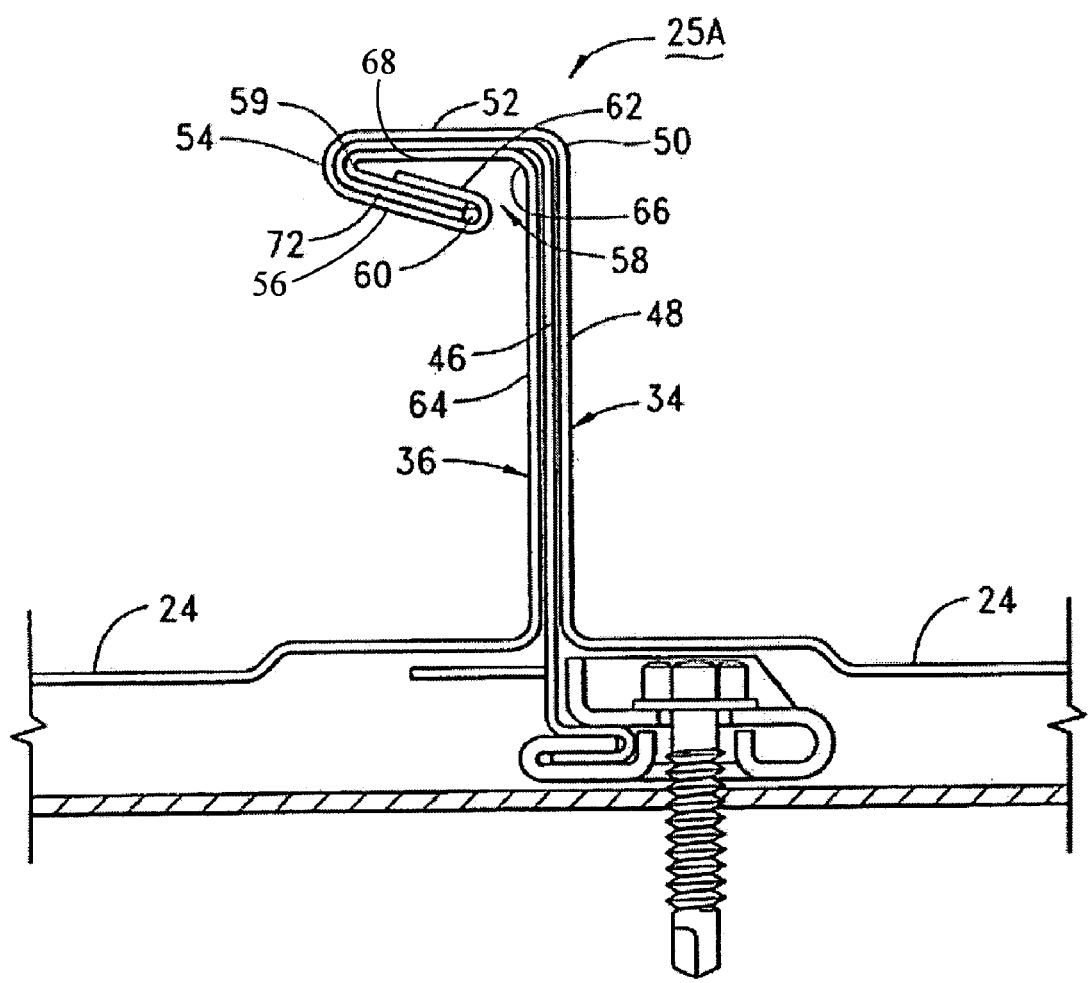
FIG. 17 is an elevational view of a standing seam assembly of FIG. 6 after field forming and attachment to the underlying roof structure.

In the seaming operation it is necessary to prevent the edge of the hook 42 of the female sidelap portion 34 from distorting in a manner that creates a scalloped edge, such as that shown in FIGS. 15 through 17. Such a scallop increases the effective width of the seamed joint which, if too wide, will interfere with the forming of the desired included angle of the second radiused portion 54 (FIG. 17) because the scalloped edge of the hook 42 will contact the fifth leg portion 68A of the male sidelap portion 36 as depicted in FIG. 16. To prevent the scalloped edges and interference it is possible to pre-crimp the hook 42 against the tang member 72 before forming the desired included angle within the second radiused portion 54. While FIG. 17 shows the standing seam 25A in its final seamed position and attached to the underlying roof structure, it will be understood that the angular disposition of the legs 52, 56, 62 (of the female sidelap portion 34), the legs 68 and locking tang 72 (of the male sidelap portion 36) and the corresponding legs of the clip 46 can be angularly determined during the seaming process as desired and can be angularly disposed such as that depicted in FIG. 9.

Similarly, FIG. 18 shows the standing seam 25B (FIG. 8) in an unseamed position, whereby both the hook 42 of the female sidelap portion 34B and the hook portion of the roof clip 46B deflectingly pass the tang member 72B of the male sidelap portion 36B, in order to wrap around the tang member 72B after seaming. FIG. 19 similarly shows the standing seam 25D (FIG. 10) in an unseamed mode with teeth or serations 115 of the clip relocated from FIG. 10. FIG. 19A shows the clip tab 46D with the penetrating teeth 115 engaging both male sidelap portion 36D and female sidelap portion 34D to prevent relative in plane movement between the two. FIG. 20 shows a modification to the standing seam 25D wherein the mastic sealant 76 is provided in two places, both at the distal ends where the female sidelap portion 34D and the male sidelap portion 36D are crimped together, and between the second leg portion 52D and the fifth leg portion 68D. FIGS. 21 and 22 show modifications wherein the third leg portion 56F of the female sidelap portion 34F and the tang member 72F of the male sidelap portion. 36F are mechanically staked together by an upset crimp 116 to prevent relative in plane longitudinal shear movement between adjacent panels.

Figure 23:
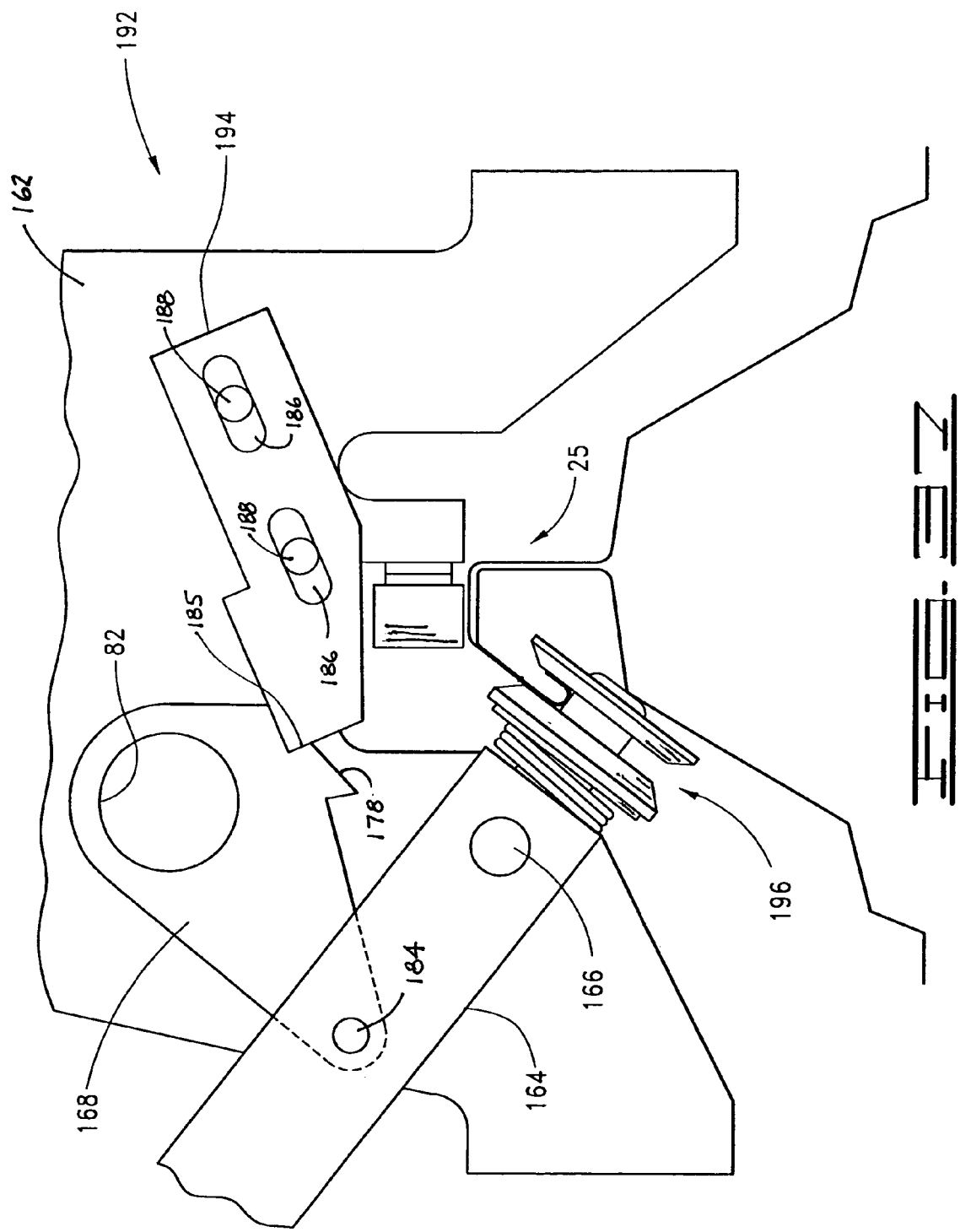
FIG. 23 is an elevational view of an alternative preferred embodiment of the standing seam assembly of FIG. 10.

FIG. 23 shows an improvement to the standing seam 25G (FIG. 10) wherein the male sidelap portion 36G forms a wedge-shaped portion 118 that is disposed inside hook 120 of the roof clip 46G. Uplift forces cause the male sidelap portion 36G to rise and to rotate clockwise and the female sidelap portion 34G to rotate counter-clockwise, thereby wedging the wedge-shaped portion 118 into the cavity of the hook 120. At a selected amount of wedging displacement a notch 122, as shown in FIG. 24, is engaged by the leading edge of the hook 120 and mechanically locks the two together to enhance the lockability and ensure that the roof clip 46G does not disengage the male sidelap portion 36G.

FIG. 25 shows the standing seam 25F of FIG. 13 in an unseamed mode. The seaming operation rotates the tang counter-clockwise and urges the tang member 104 and the distal end of the roof clip 46F around the distal end of the male sidelap portion 36F as shown in FIG. 26, with the distal end of the tang member 104 receivingly engaged in the retaining groove 91 in the final seamed mode.

FIG. 27 shows an alternative two-piece roof clip 122, which has a hold down clip 124 as well as a clip base 126 to which the hold down clip 124 is attached. The clip base 126 has a beam section 128 and an upwardly pointing flange portion 130 having a top flange surface 132. The beam section 128 and flange portion 130 slidingly support the hold down clip tab 124 to limit vertical movement thereof, and to provide for longitudinal movement of the hold down clip tab 124 relative to the clip base 126 along the beam section 128. More particularly, the hold down clip has a first tab member 134 that slidingly engages an inside surface 136 of the beam section 128, and a pair of second tabs 138 that slidingly engage an opposing outer surface 140. A third pair of tabs 142 extend from the first tab member 134 and slidingly engage the flange surface 132. In this manner, the flange surface 132 essentially provides a track on which the hold down clip 124 slides in a longitudinal direction.

FIG. 28 shows the hold down clip 124 before being installed to the clip base 126, which is accomplished by inserting the first tab member 134 and the second tabs 138 around the beam section 128 of the clip base 126. The first tab member 134 is formed upward and a distal end thereof placed inside the beam section 128. The second tabs 138 are formed downward to engage the beam section 128 in opposition to the first tab member 134. FIG. 29 shows the hold down clip 124 installed in this manner on the clip base 126.

The clip base 126 can be formed from a single piece of sheet metal formed as shown so as to include rib sections 142 and embossments 144 to provide additional strength and resistance to distortional forces upon the clip base 126.

The base of the clip base 126 is anchored to the underlying structure, such as a purlin, using conventional hardware such as a screw such as shown in FIG. 30. More particularly, the fasteners are placed through openings 146 in a bottom facing flange 148 of the clip base 126. To provide a solid connection of the base over thermal insulation above the purlin, the flange portion 148 is formed with feet 150 that extend downwardly at an angle substantially normal to the flange portion 148 and which thereby easily compress the thermal insulation so as to bear solidly on the purlin. The feet 150 are formed by punching square holes through the flange portion and forming opposing sides of the square downward. Additionally, a back edge 152 of the flange portion 148 is formed downwardly to provide a foot 154 that acts in cooperation with the feet 150 to support the flange portion 148.

Finally, FIG. 30 shows the standing seam 25C formed of adjacent panels 24A having trapezoidal sidelap portions and secured to the underlying roof structure with the two-piece roof clip 122 of FIG. 27. It will be noted that all of the exemplary configurations of the standing seam 25 discussed herein above can be used with either flat pan or trapezoidal sidelap portions, and with either a one-piece roof clip 46 or a two-piece roof clip 122.

FIGS. 31–38

Having discussed several embodiments of the standing seam 25, as well as alternative sidelap portion configurations and roof clip configurations, attention will now be directed to a novel method of seaming the standing seam 25 during field installation of a standing seam roof.

As discussed above, the standing seam 25 requires a pre-crimping operation of the hook 42 of the female sidelap portion 34 prior to jointly forming the tang member 72 of the male sidelap portion 36 and the third leg portion 56 of the female sidelap portion 34 to the desired angle at the first radiused portion 50 and second radiused portion 54. This prevents scalloping of the edge of the hook 42 as discussed above and shown in FIG. 16.

Figure 31:
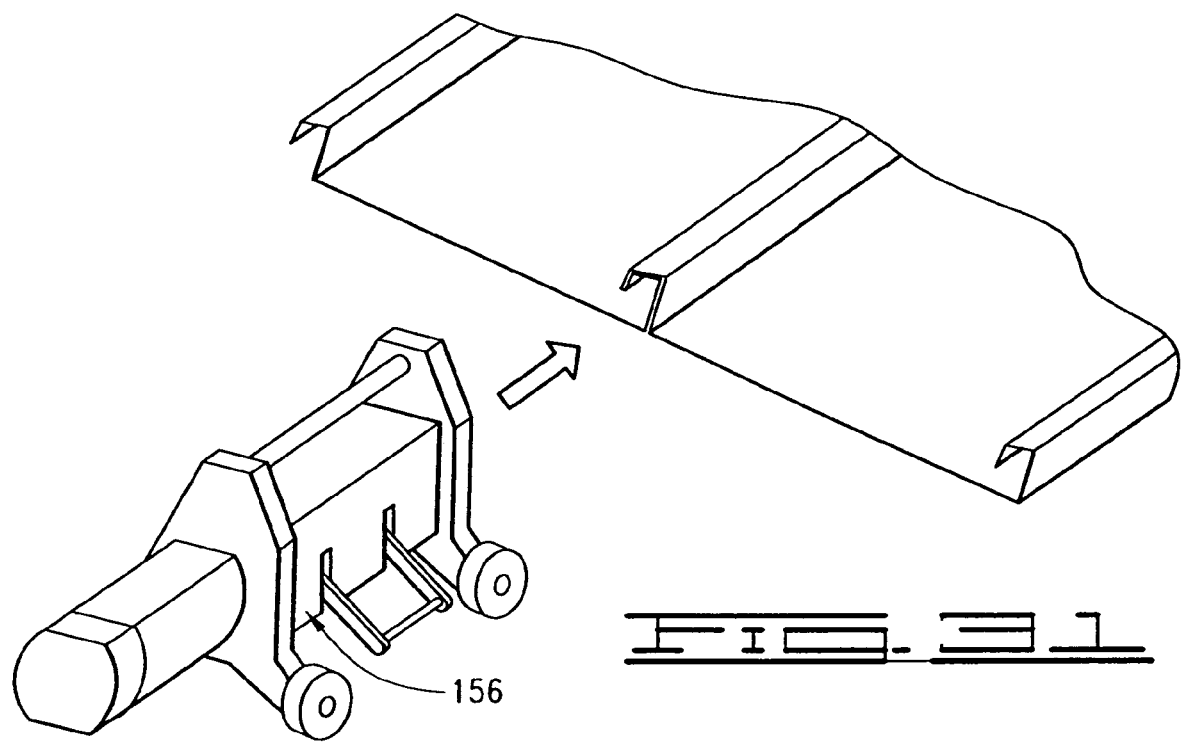
FIG. 31 is a diagrammatic view of a conventional seaming machine.
Figure 32:
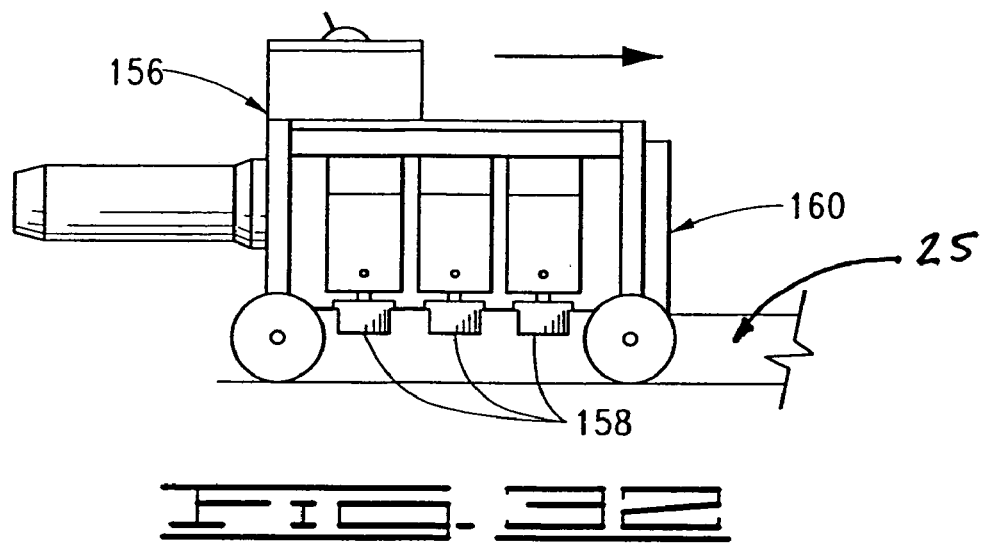
FIG. 32 is a side view of the seaming machine of FIG. 31 with a precrimping attachment constructed in accordance with the present invention.
Figure 33:
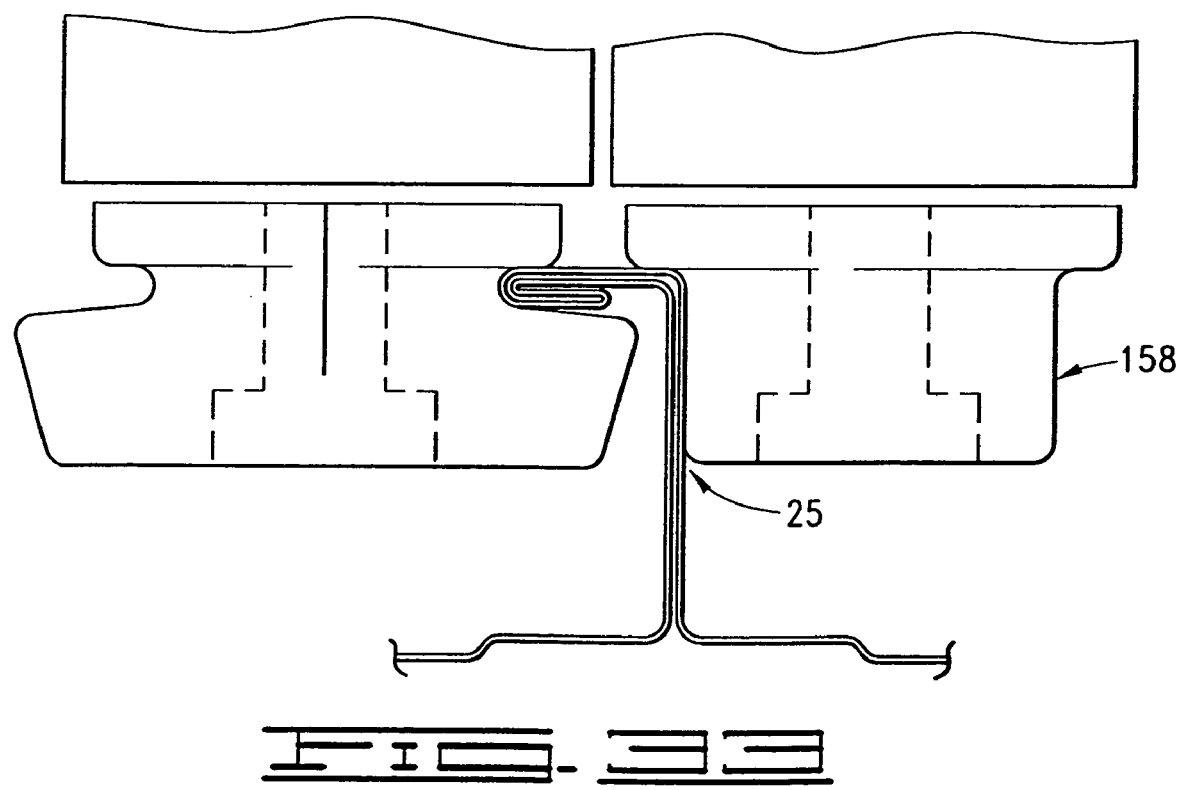
FIG. 33 is an elevational view of one of the roller sets of the seaming machine of FIG. 31 in seaming engagement with a standing seam assembly of the present invention.

FIG. 31 shows a conventional seamer apparatus 156 that is widely used in the art to perform seaming operations on standing seam roofs. FIG. 32 is a side view of the seamer 156, which typically employs a series of rollers 158, usually three sets, to progressively form the standing seam with the pre-crimper attached to the front plate. FIG. 33 shows one set of the opposing rollers 158 in crimping engagement with the standing seam 25. However, the seamer apparatus 156 is not in of itself adequate to seam the standing seam 25 to completion as required herein.

One method of adding the needed preforming operation to the seamer 156 shown in FIG. 32 is to add another set of rollers configured to crimp the standing seam 25, but to do so would require a relatively expensive modification in order to extend the chassis and gear mechanisms. An alternative approach is to provide a bolt-on attachment supporting an additional set of precrimping rollers to the front of the existing chassis of the seamer 156.

Figure 34:
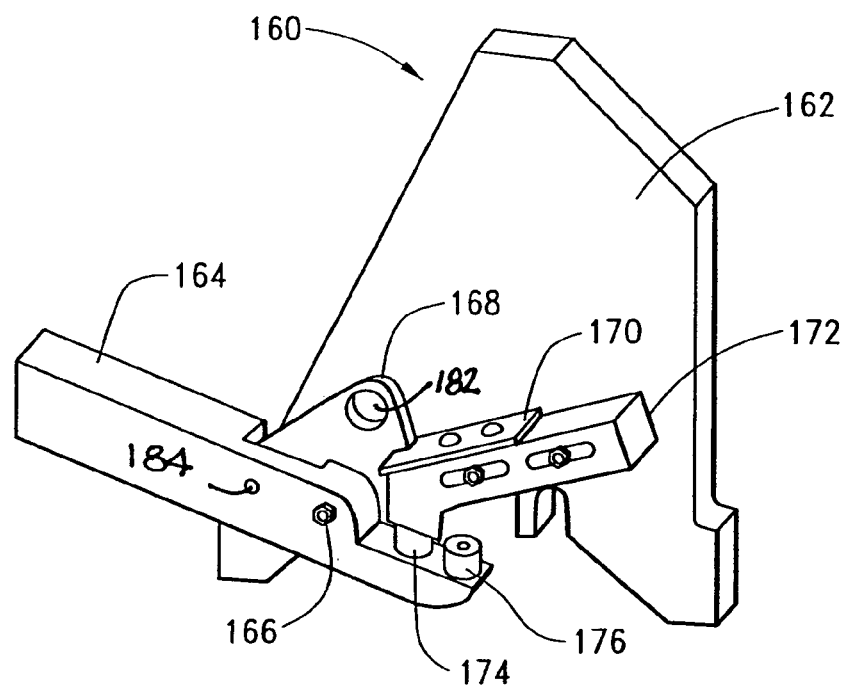
FIG. 34 is an isometric view of a pre-crimping assembly attachment for use with the seaming machine of FIG. 31.

FIG. 34 shows a pre-crimping assembly 160 that is attachable to the seamer 156 for use on a standing seam roof having flat pan sidelap portions, such as a roof constructed with the panel 24 shown in FIG. 3. The pre-crimping assembly 160 has a support plate 162 that is a part of the conventional prior art seamer and which supports a handle 164 that pivots about an eccentric bushing 166 depending from the support plate 162, a latch 168 pinned to the handle and lockingly engageable with a latch plate 170, and a roller bracket 172 supported by the support plate 162 and supporting, in turn, the latch plate 170. The roller bracket 172 supports a first cam roller 174, and the handle 164 supports an opposing second cam roller 176.

Figure 35:
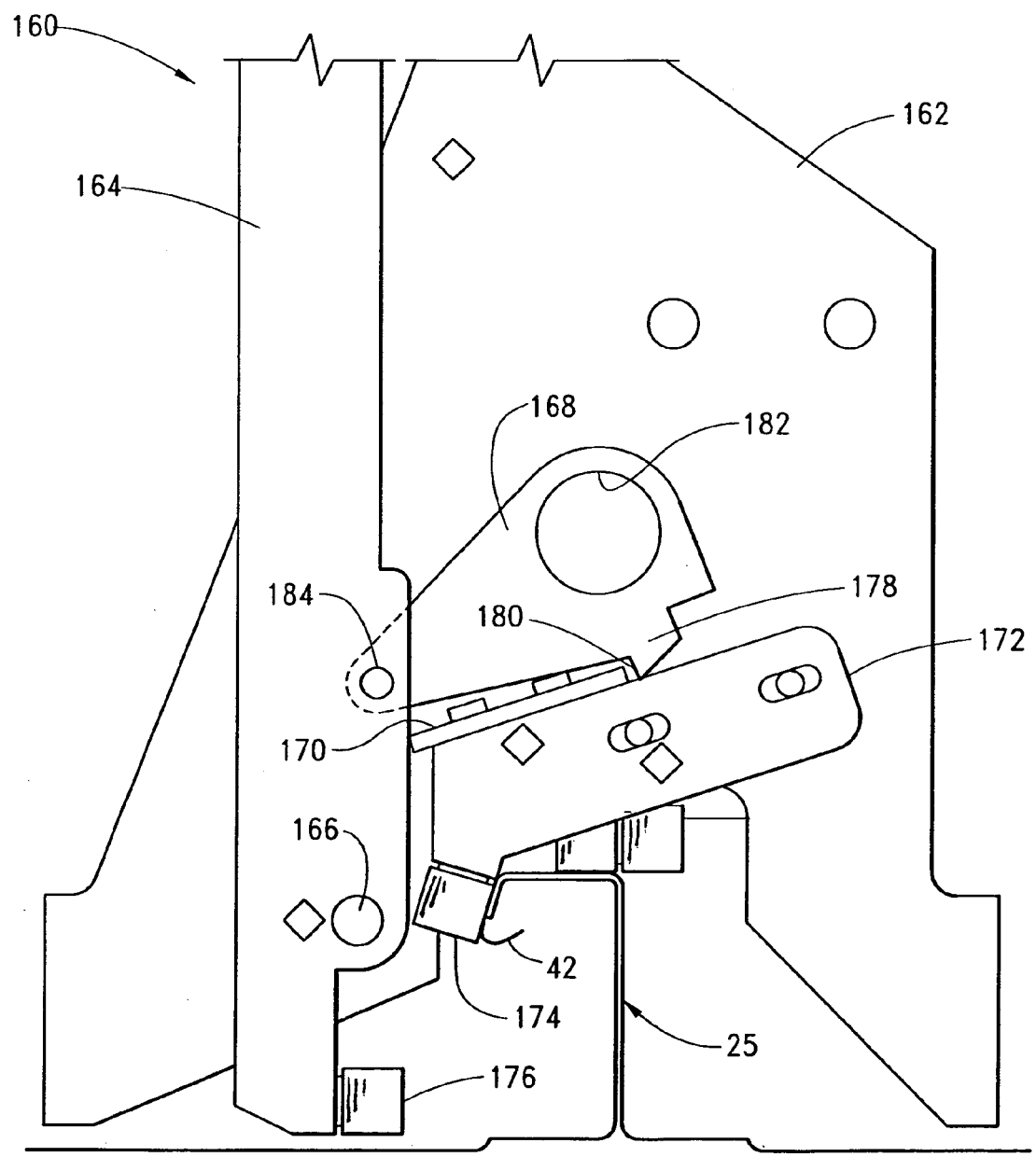
FIG. 35 is an elevational view of the pre-crimping assembly of FIG. 34 for use on the standing seam assembly of FIG. 3, the pre-crimping assembly shown in an open mode.
Figure 35:
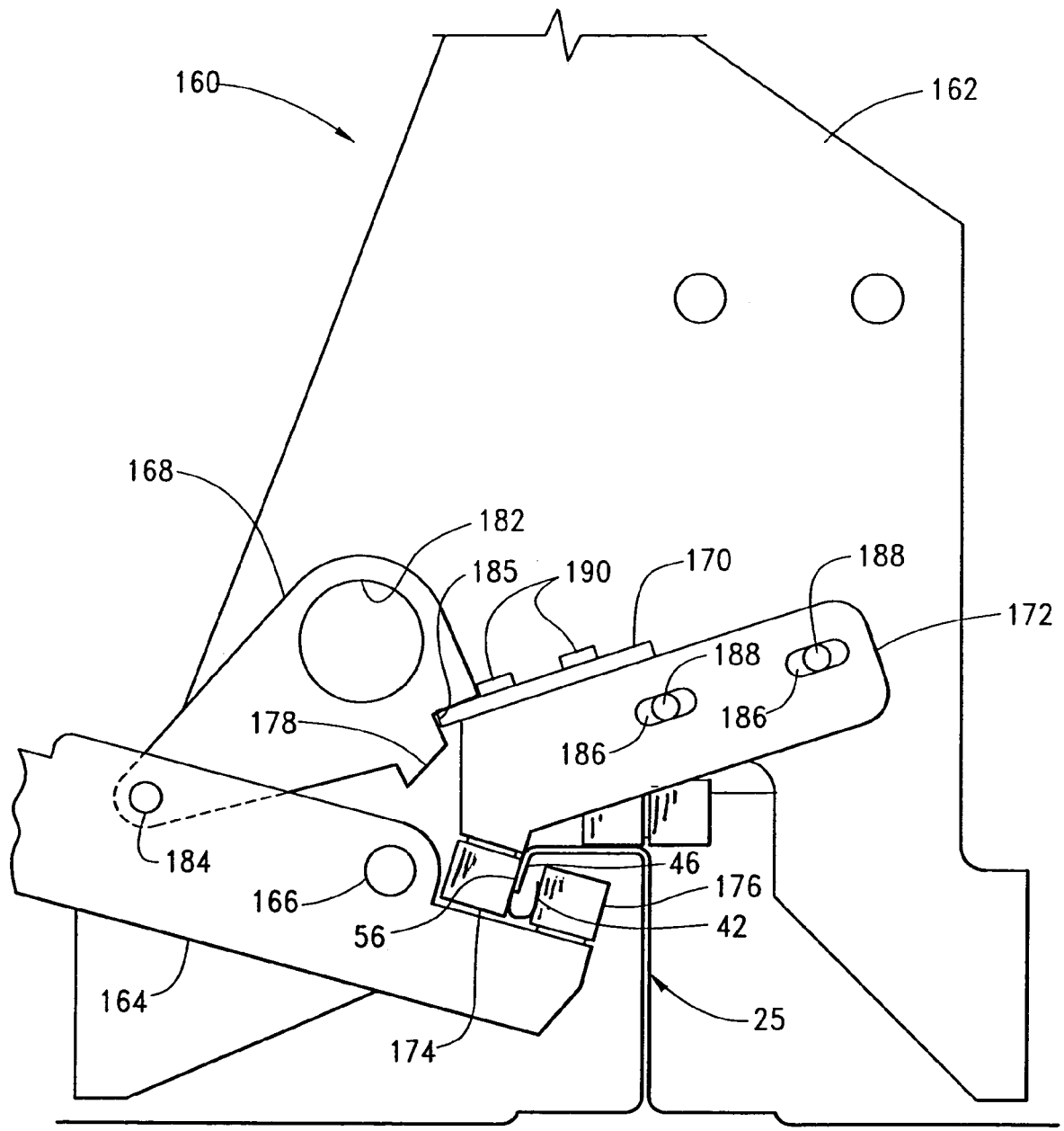

FIG. 35 shows the pre-crimping assembly 160 operably positioned adjacent a standing seam 25 in an open position, whereby the latch 168 has a locking gear 178 having a surface 180 abuttingly engaging the latch plate 170 to maintain a substantially vertical position of the handle 164 and thus retraction of the second cam roller 176 from the standing seam 25. The latch 168 has a finger hole 182 to facilitate the lifting thereof about a pin 184 supported by the handle 164, thereby disengaging the locking gear 178 from the latch plate 170. This allows the handle 164 to rotate about the eccentric bushing 166 to position the second cam roller 176 into operable engagement with the hook 42 of the female sidelap portion 34, as FIG. 36 which shows the pre-crimping assembly 160 in a closed position. The handle 164 is maintained in the closed position by the pressing engagement of a surface 185 of the locking gear 178 against the latch plate 170.

In use, the seamer 156 with the pre-crimping assembly mounted thereon is placed in the open position and positioned adjacent the standing seam 25 that is to be field seamed. The roller bracket 172 is adjustably positionable by a slot 186 and threaded fastener 188 arrangement. The roller bracket is thus positioned so that the first cam roller 174 touches the third leg portion 56 of the female sidelap portion 34. The latch 168 is then raised and the handle 164 is lowered to place the second cam roller 176 parallel to the first cam roller 174, and spaced approximately 5/32 inch therefrom. The latch plate has a slot (not shown) and threaded fastener 190 arrangement, like the roller bracket 172 attachment to the support plate 162. The latch plate 170 is thus adjusted to provide a locking engagement with the locking gear 178 of the latch 168 to maintain the desired position of the second cam roller 176.

FIG. 37 shows a pre-crimping assembly 192 for use on a standing seam roof panel having trapezoidal sidelap portions, such as the panel of FIG. 4. The pre-crimping assembly 192 has several of the same components as the previously described pre-crimping assembly 160, namely the support plate 162 which supports a handle 164 about an eccentric bushing 166, and a latch 168 pinned to the handle 164, the latch 168 having a locking gear 178. Furthermore a latch plate 194 supports the latch 168 in a desired position. The handle 164 supports a crimping roller assembly 196, which is shown in exploded detail in FIG. 38.

FIG. 38 shows a bottom roller 198 having a shaft portion 200 which engages a bore 202 of a top roller 204. One or more spring washers 206, such as a Belleville type, and a flat washer 208 are stacked on the shaft 200 and against the top roller 204. If more than one spring washer 206 is used, the spring washers 206 can be stacked parallel or opposite to each other to achieve the desire position and spring compression. A circle clip 210 engages a groove 212 in the shaft 200 to retain the components of the crimping roller assembly 196.

In use, the crimping roller assembly 196 is similarly set up as the precrimping assembly 160 discussed previously. By lifting the latch 168 the handle 164 can be lowered to bring die crimping roller assembly 196 into operable engagement with the standing seam 25. The eccentric bushing 166 is rotated to align the roller flanges with the seam. The latch plate 194 is adjusted to place the roller assembly 196 to the proper depth of engagement with the seam 25, and the precrimping assembly 196 is then moved along the seam 25 to achieve the desired field seaming.

In the above discussions the merits of a standing seam roof with few or no fasteners penetrating the sheet metal panels at medial portions thereof has been recognized. Generally, applications of standing seam roof panels with floating roof clips have capitalized on reducing the medial penetrations in order to minimize leak paths through the roof. At times, however, the lack of medial attachment of the panels to the underlying support structure can result in an undesirable reduction in diaphragm strength of the roof or wall, resulting in a need for additional bracing.

In order to achieve good diaphragm strength, the panels making up the roof or wall must possess a number of qualities. One such quality is resistance to one panel sliding in relation to an adjacent panel. This quality is referred to as in plane panel sidelap shear capacity. Such panel sidelap shear capacity, or resistance to sliding, can be achieved in a number of ways. A sufficient diaphragm strength is necessary to prevent the roof panels from "saw toothing" when subjected to a lateral "racking" load.

Figure 39:
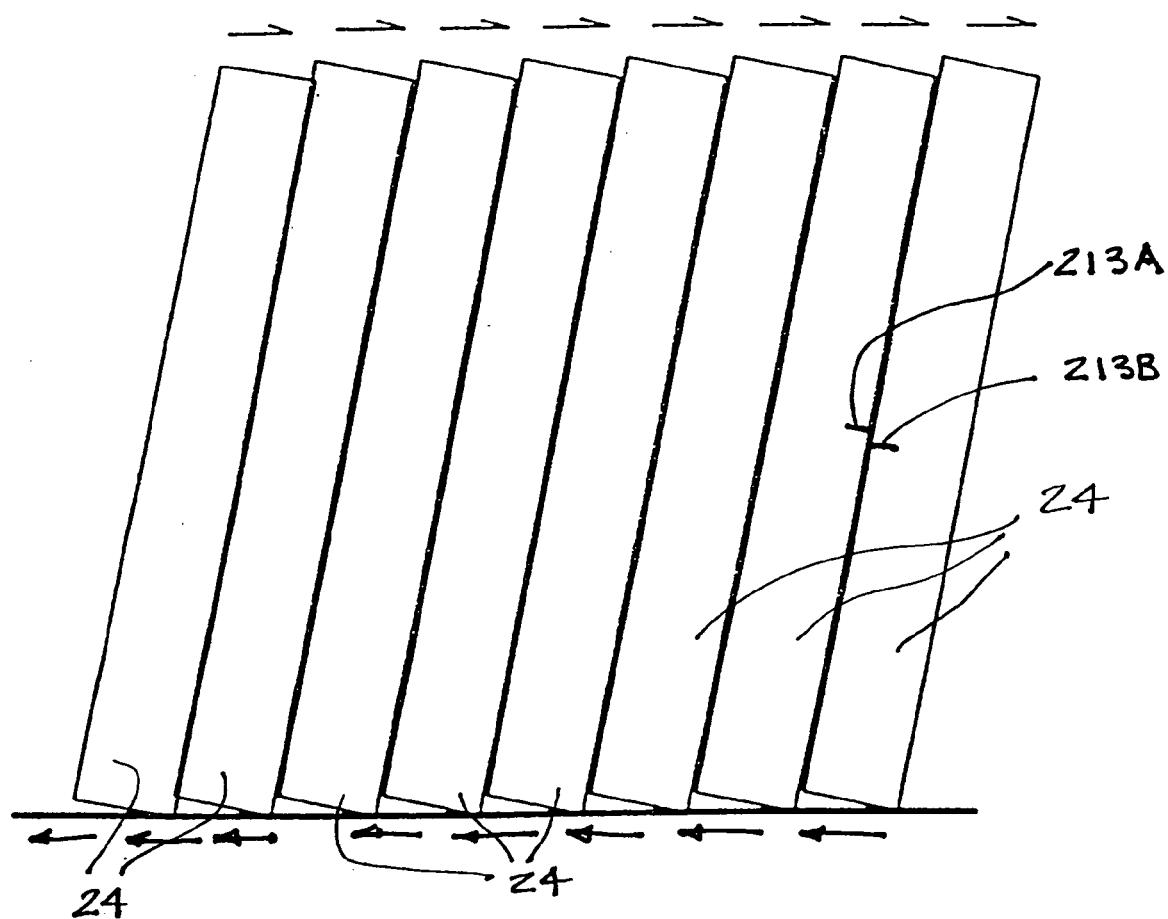
FIG. 39 is a diagrammatical representation showing one seamed configuration of adjacent roof panels of the present invention resisting when subjected to load.

This is illustrated in FIG. 39 in which is depicted a plurality of roof panels 24 having the seamed configuration of the present invention and that are resisting unfurling when subjected to uplift loading. That is, FIG. 39 represents a portion of adjacent panels such as metal roof or wall panels that are subjected to diaphragm loads that occur in the sidewall or roof of a metal building when wind load is applied to the building or in a floating standing seam roof supported by zee purlins, wherein as the roof is subjected to downward load the purlins tend to rotate in the direction of the compression flange and the diaphragm strength of the roof helps prevent such movement and stiffens the purlins between purlin to frame attachment points. The opposing force arrows (not separately designated) depict this diaphragm shearing load.

For the panels 24 to resist the diaphragm load, among other things, the panels must resist movement, or sliding, of adjacent panels. To illustrate the shearing movement under such load, a pair of marks 213A and 213B are shown at the edges of the two panels at the right side of FIG. 39; under normal condition, prior to the implementation of the present invention, the marks 213A and 213B were aligned before the sideward movement of the panels 24. As depicted, without medial attachment of the panels 24 to the underlying support structure, the panels 24 are permitted to slidingly rotate as illustrated by the misalignment of the marks 213A and 213B. That illustrated in FIG. 39 is a lack of in plane panel sidelap shear capacity of the panels 24 as mounted. The present invention, once installed, provides an appropriate degree of panel sidelap shear capacity to the panels 24 and these panels will remain in the installed position so that the marks 213A and 213B remain aligned under diaphragm shearing load.

Figure 40:
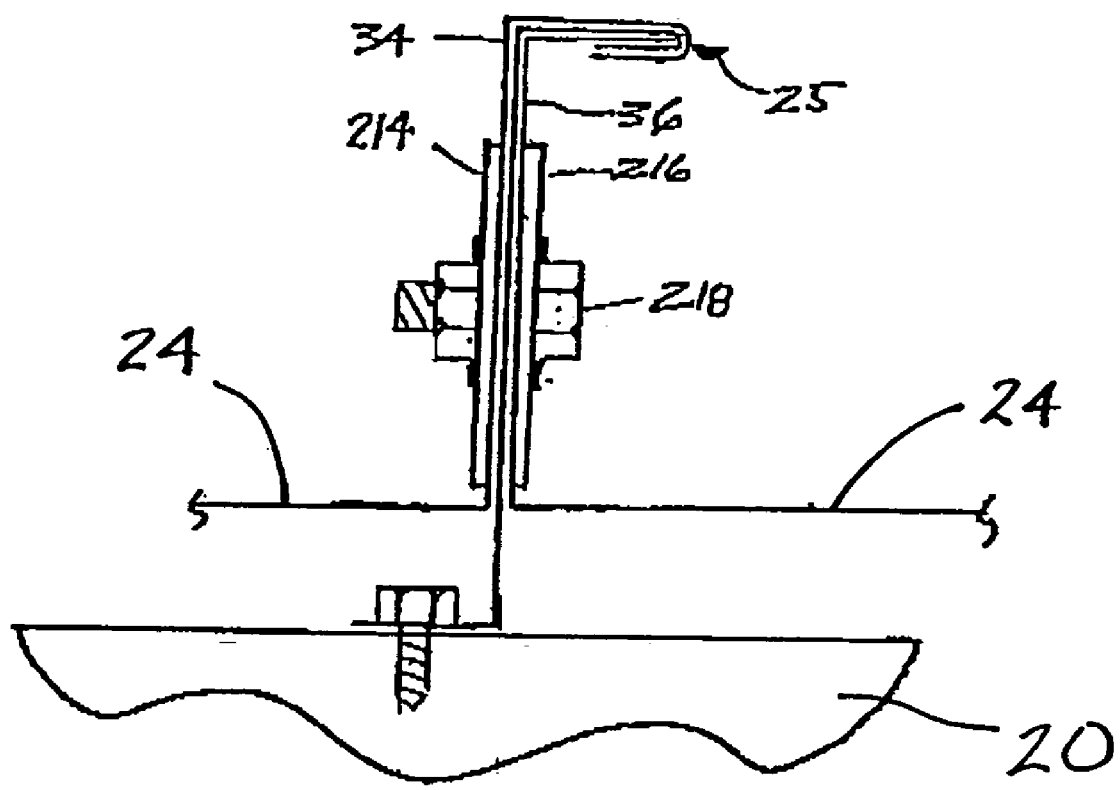
FIG. 40 is a diagrammatical representation showing one other seamed configuration of adjacent roof panels of the present invention resisting in plane shear movement when subjected to load.
Figure 41:
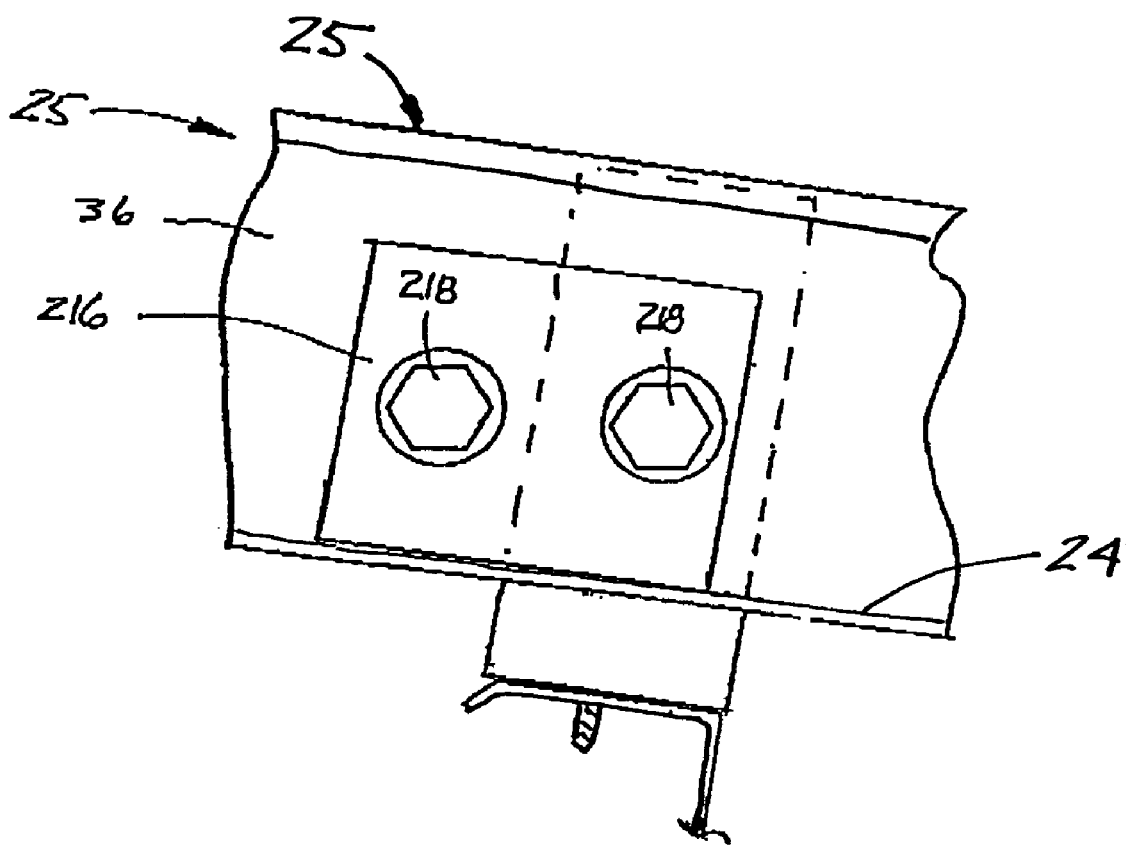
FIG. 41 is an elevational view of the standing seam assembly of FIG. 40.

One embodiment of the present invention to increase the diaphragm strength of a standing seam roof is to attach a backer plate on the upstanding portions of the sidelap portions, as illustrated in FIGS. 40 and 41. Shown therein is a support plate 214 engaging the female sidelap portion 34 and a support plate 216 engaging the male sidelap portion 36 of the standing seam 25 of interlocking adjacent roof panels 24 supported on the secondary structural system 20. One or more fasteners 218 (FIG. 41) connect the support plates 214, 216 to compressingly sandwich the sidelap portions there between. The tightened fasteners 218 increase both the frictional and shear resistance between the sidelap portions 34, 36 to prevent sliding movement there between.

Preferably, the support plates 214, 216 would be used in protected areas of the roof, such as the ridge of a building which is protected by ridge trim, so that the through fasteners 218 do not show and are not exposed to the weather elements.

Figure 42:
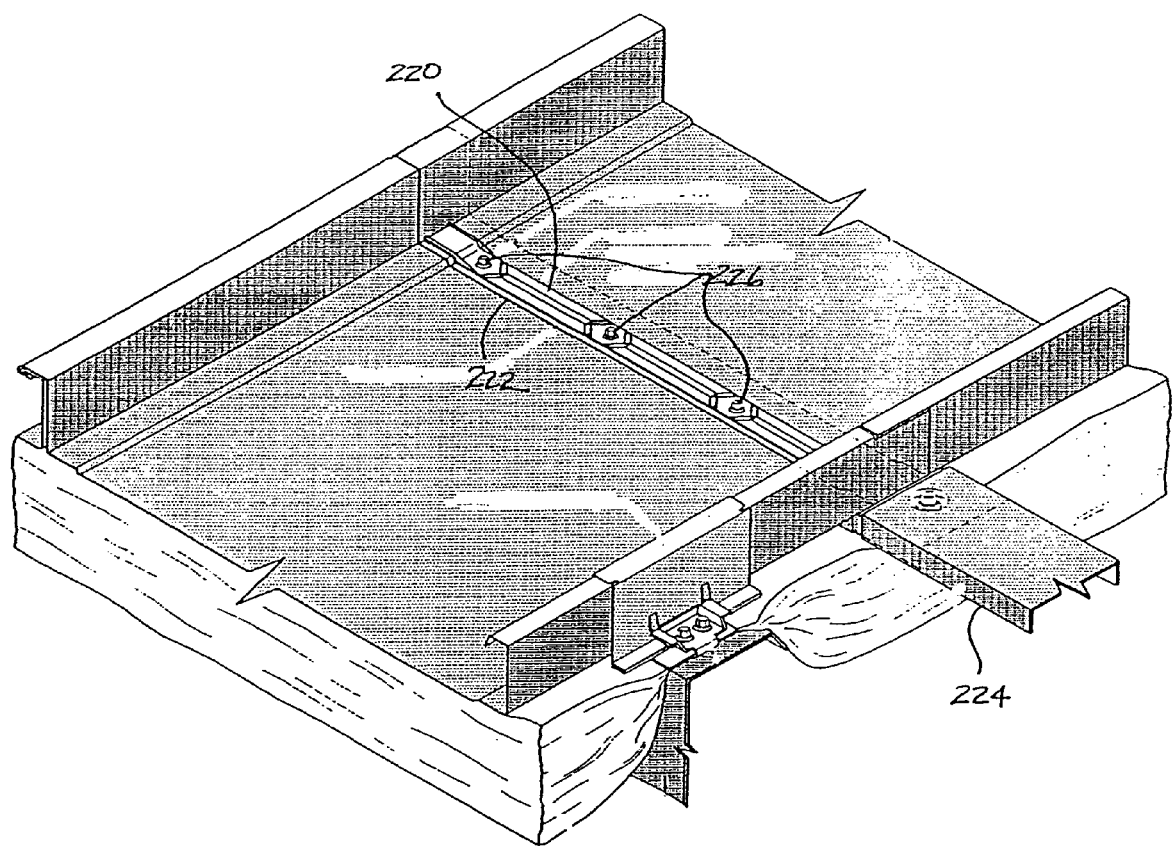
FIG. 42 is an isometric view of a standing seam roof assembly having a cinch plate and backer beam attached together at the endlap portion of the roof members to increase the diaphragm strength of the roof assembly.
Figure 43:
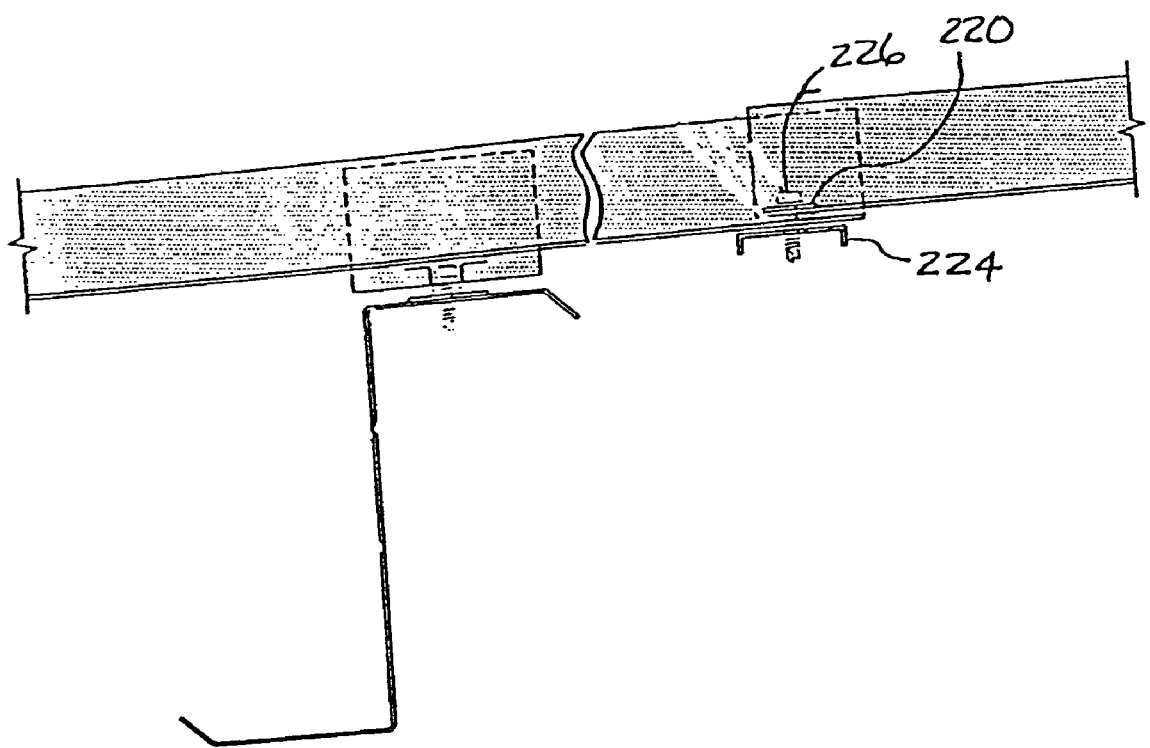
FIG. 43 is an end view of the standing seam roof assembly of FIG. 42.

Another embodiment of the present invention to increase the diaphragm strength of a standing seam roof is a backer and optional cinch plate securement at the panel endlap or ridge locations. FIGS. 42 and 43 show an optional cinch plate 220 placed on top of a panel which is in turn placed over a tape sealant 222 at the panel endlap location. A backer channel (or beam which may take numerous shapes) 224 is positioned under the cinch plate 220, and a number of fasteners 226 draw the cinch plate 220 and the backer channel 224 together. The backer channel 224 extends under and bridge between adjacent panels, which are similarly attached to the backer channel 224 via additional optional cinch plates 220 and fasteners 226. Thus, the multiple cinch plates 220 and fasteners 226 sandwich the panels 24 to the underlaying backer channel 224. The tightened fasteners 226 also increase the lateral resistance to sliding of end to end overlapped panels and the backer channel extending between adjacent panels.

The tightened fasteners 226 increase the shear resistance between adjacent panels in the vicinity of the endlap portions of the roof panels to prevent sliding between adjacent panels. The beam strength of the backer channel 224 serves to prevent adjacent panels from sliding in relation to each other. FIG. 43 shows an end view of the cinch plate 220 and backer channel 224 of FIG. 42. As noted above, a similar bridging arrangement between adjacent panels to prevent relative sidelap movement was discussed with reference to FIGS. 40 and 41 for a roof ridge condition.

Figure 44:
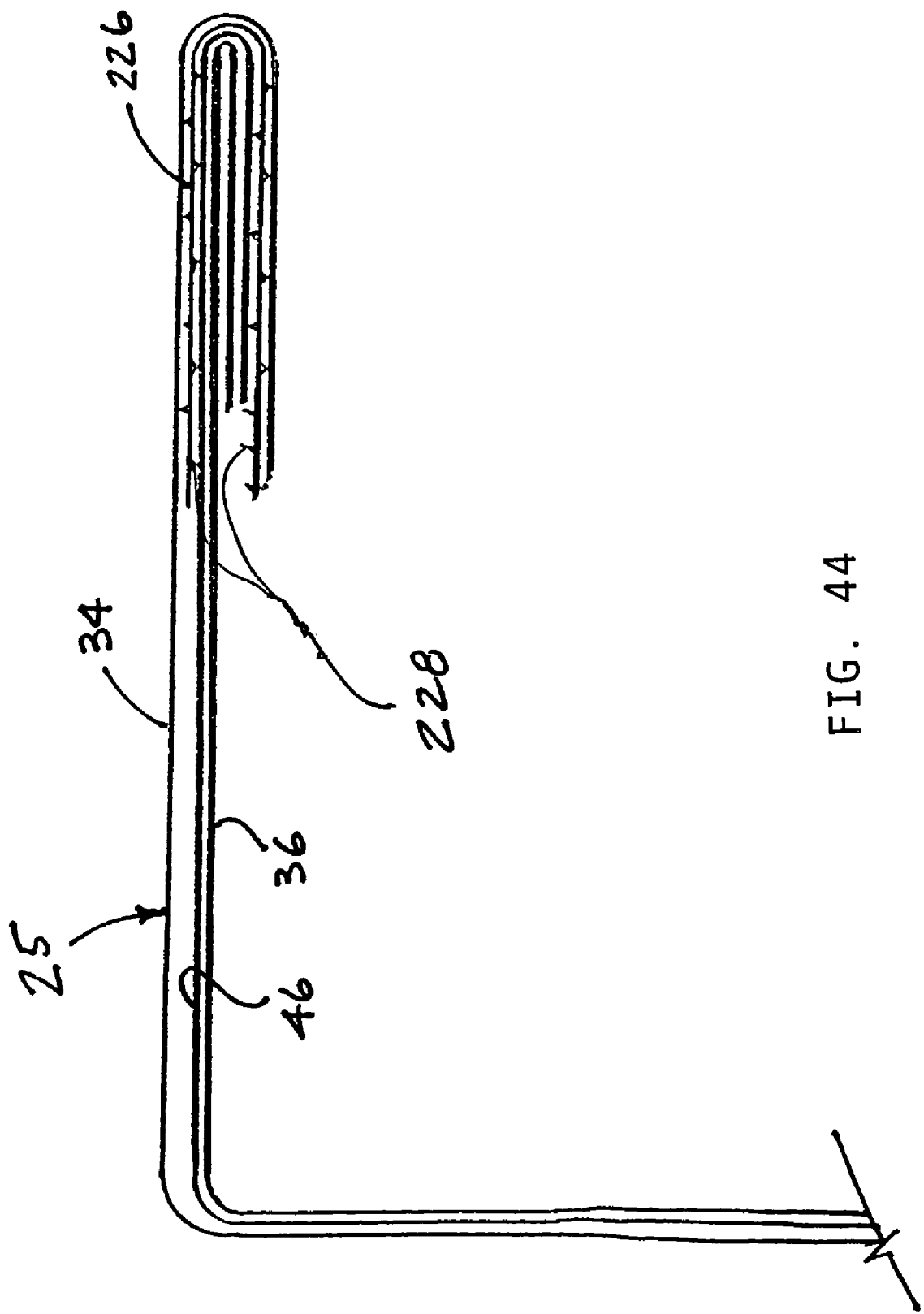
FIG. 44 is an end view of a standing seam assembly having a serrated plate seamed between the male sidelap portion and the female sidelap portion to increase the diaphragm strength of the standing seam roof assembly.

FIG. 44 shows yet another way of increasing the diaphragm strength of a standing seam 25 by using serrated plates 226 (see also clip 46D in FIG. 10; and clip 46D of FIG. 19A) at intervals along the seam. Each serrated plate 226 (or clip 46D) is placed between the male and female sidelap portions and optionally seamed with a seamer such as 156 of FIG. 31. Each plate 226 has plurality of protruding teeth 228 that engage both the male and female sidelap portions to grippingly retain these members so as to prevent sliding movement there between. The serrated plate 226 may be used at a clip or at points between clips.

FIG. 45 illustrates the manner in which the seamed configuration of adjacent roof panels of a roof of the present invention resist unfurling or unzipping when subjected to uplift loading. As depicted in FIG. 45, uplift forces tend to lift and rotate the roof panels this is resisted by the standing seam 25B. The lifting and rotating force on the female sidelap portion 34B is along the directional arrow 230. The lifting and rotating force on the male sidelap portion 36B is along the directional arrow 232. A downward force in the direction of arrow 234 is exerted by the roof clip 46 resulting in the secure attachment of the standing seam 25B to the underlying support structure.

The amount of deflection illustrated by the uplift forces in FIG. 45 is dramatic and certainly beyond the elastic limit of the panels. Even so, the standing seam integrity is maintained so that the adjacent panel seams do not unfurl or unzip. It will be noted that the radiused portion 82 of the roof clip 46B is lockingly engaged with the tang member 72B so that the forces 234 and 232 will not separate the roof clip 46B from the male sidelap portion 36B. It will be further noted that the female sidelap portion 36B is lockingly engaged with the male sidelap portion 34B so that the forces 230 and 232 will not separate the sidelap portions.

Figure 46:
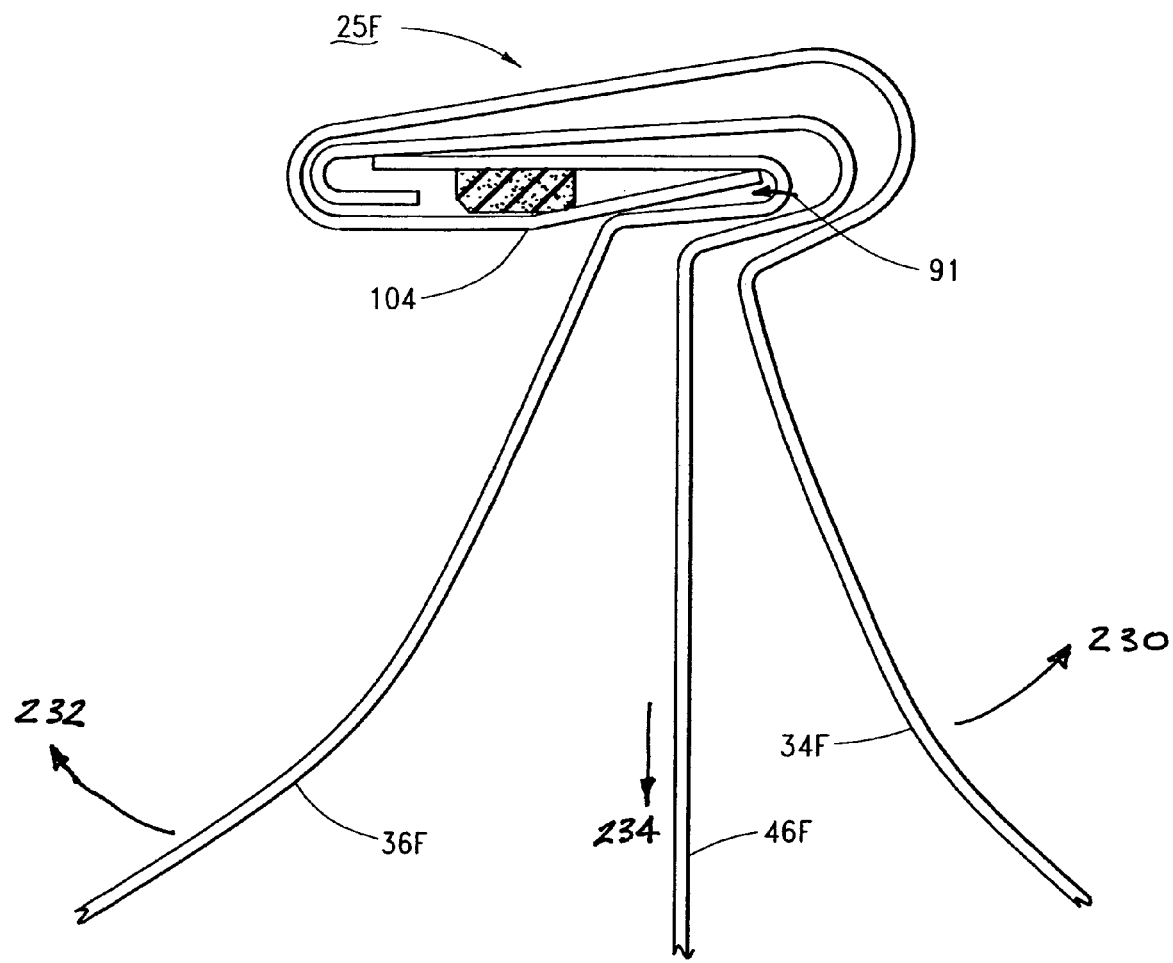
FIG. 46 is an elevational view of the standing seam assembly of FIG. 13 illustrating the standing seam assembly subjected to applied load forces.

It will be noted from FIG. 46 that the uplift forces 230, 232 that tend to lift and separate the male sidelap portion 36F of the standing seam 25F and the female sidelap portion 34F produce forces in the opposite direction on the tang member 104 and the retaining groove 91, so as to drive the tang member 104 ever more into the retaining groove 91. In this manner, the uplift forces 230, 232 do not succeed in unfurling the standing seam 25F.

Returning to FIGS. 10, 21–22 and 39–44, there are two principal reasons that devices such as those disclosed here to increase the diaphragm strength of building roofs and walls may not be accepted as readily as they could be. People often object to bolts, nuts and fasteners penetrating the roof panel from the outside because the fasteners may corrode, leak or impair aesthetics. When using the apparatus of FIGS. 40 and 41, 42 or 43, it is desirable to make the apparatus as attractive, functional and unobtrusive or inconspicuous as possible. However, changing product uses and functional requirements have increased the need for improved diaphragm strength and for this type device. One of these is that diaphragm strength has a direct impact on the structural strength of zee purlins used as support members for panels. Technical requirements relating to the stability of zee purlins are becoming much more rigorous, as is the stability of the overall structure. Diaphragm strength can contribute directly to both of these, and this mitigates the objections mentioned above.

In the embodiment of FIGS. 42 and 43, it is preferable that the outside fastener 226 on each side of the panel be located as close to the edge of the panels as practical to minimize buckling of the cinch strap, back-up plate or panels as the joint is subjected to shear load.

Aesthetics and functionality may be improved in the apparatus disclosed in FIGS. 40 and 41 by using a flat head bolt with the flat head of the bolt located and pressing against the surface of the female sidelap portion 34. The bolt head may be large enough to distribute the compressive load over an appropriate area and it may be applied in such a manner as to make it as inconspicuous as possible. The underside of the bolt head may be coated with an appropriate material to seal between the bolt head 218 and the surface of the female sidelap portion 34. The nut may be located under the projecting corrugation 25 which will, at least, partially hide the nut which can be made as inconspicuously as possible by finishing and forming it so that it is not obtrusive.

The bolt and nut may be located as close as possible to upper flange 25 to hide it, and the nut also may be made watertight by the proper application of a sealant material between the nut and the exterior of the male sidelap portion 36. If the bolt extends through the nut, the sealant between the nut and the surface of the male sidelap portion 36 may be forced around the bolt threads by the pressure exerted by the bolt to form a watertight joint.

The nut may also take an alternate form, that of an "acorn" nut, which is one that covers over the end of the bolt so that there can be no leaking between the bolt threads and the nut threads from the outside end of the bolt. If an acorn nut is used, the bolt length must be coordinated with the thickness of the materials to be included in the bolt grip after the nut has been applied so the depth of the bolt does not penetrate into the full depth of the acorn nut. This will enable the nut and the bolt head to force the material between them together so as to form a watertight, structurally sound, aesthetically pleasing joint. The apparatus may be located at a panel clip, in between panel clips or it may be located periodically throughout the length of the panel corrugation at critical locations such as panel endlap splices, the ridge, eave or other locations.

The apparatus disclosed in FIGS. 40 and 41 may be used in conjunction with other panel devices such as the back-up plate and cinch strap shown in FIGS. 42 and 43 to achieve the necessary diaphragm strength. If the apparatus is used with a clip, the clip may be a floating or fixed clip and doing this may also have the beneficial effect of strengthening the panel to increase its resistance to wind uplift. The bolt and nut may be made of corrosion resistant material such as stainless steel to improve its functional performance and acceptability.

The apparatuses disclosed in FIGS. 10, 21 and 22, 42 and 43 and 44, 40 and 41 may be used in a specific area of the buildings such as at particular roofing areas that are more likely to sustain diaphragm shear loading in order to meet the zoned diaphragm strength requirements as discussed in my U.S. patent application Ser. No. 09/775,480 filed Feb. 2, 2001, entitled ZONE BASED ROOFING SYSTEM.

In order to assemble the device shown in FIGS. 40 and 41, it is desirable to compress the material through which the bolt penetrates when using a bolt with an acorn nut. The reason for this is the grip of the fastener will be limited to a given range and this grip range may not be great enough to reach through the material to be fastened together if the material is not forced together prior to attempting to apply the acorn nut. The necessary compression can be achieved by applying pressure next to the pre-drilled hole previously formed to receive the bolt using tongs pliers or vice-grip type device similar to a large pair of specially formed pliers having enlarged jaw gripping surfaces. Of course, another device that can be used to increase the frictional resistance between adjacent panes and to increase their resistance to shear forces in adjacent panels, is that of a U-shaped member (not shown) that has slot into which the standing seam can be received, and the housing having threaded apertures so that threaded rods can be positioned to exert closing pressure on the adjoined panels. Since frictional resistance is normally proportional to applied pressure, the frictional resistance and resistance to shear movement between the two adjacent panels is increased. These pressure apparatuses can used in conjunction with the apparatus of FIG. 44 to increase the effectiveness.

It is important to note that when the embodiments of the present application are used to increase the diaphragm strength of a portion of a roof, the overlap of the back-up plate on two adjacent panels as shown in FIGS. 42 and 43 or the bolted device disclosed in FIGS. 40 and 41 should be used continuously at each joint between adjacent anchor points. Further, it is advisable that an anchor device be used intermittently such as at primary support points or at the end of the panel runs should be adequate to transfer the shear or diaphragm load from the roof panels to a supporting structure member, such as a rigid frame, capable of resisting the diaphragm or shear force developed in the roof or wall.

Figure 47:
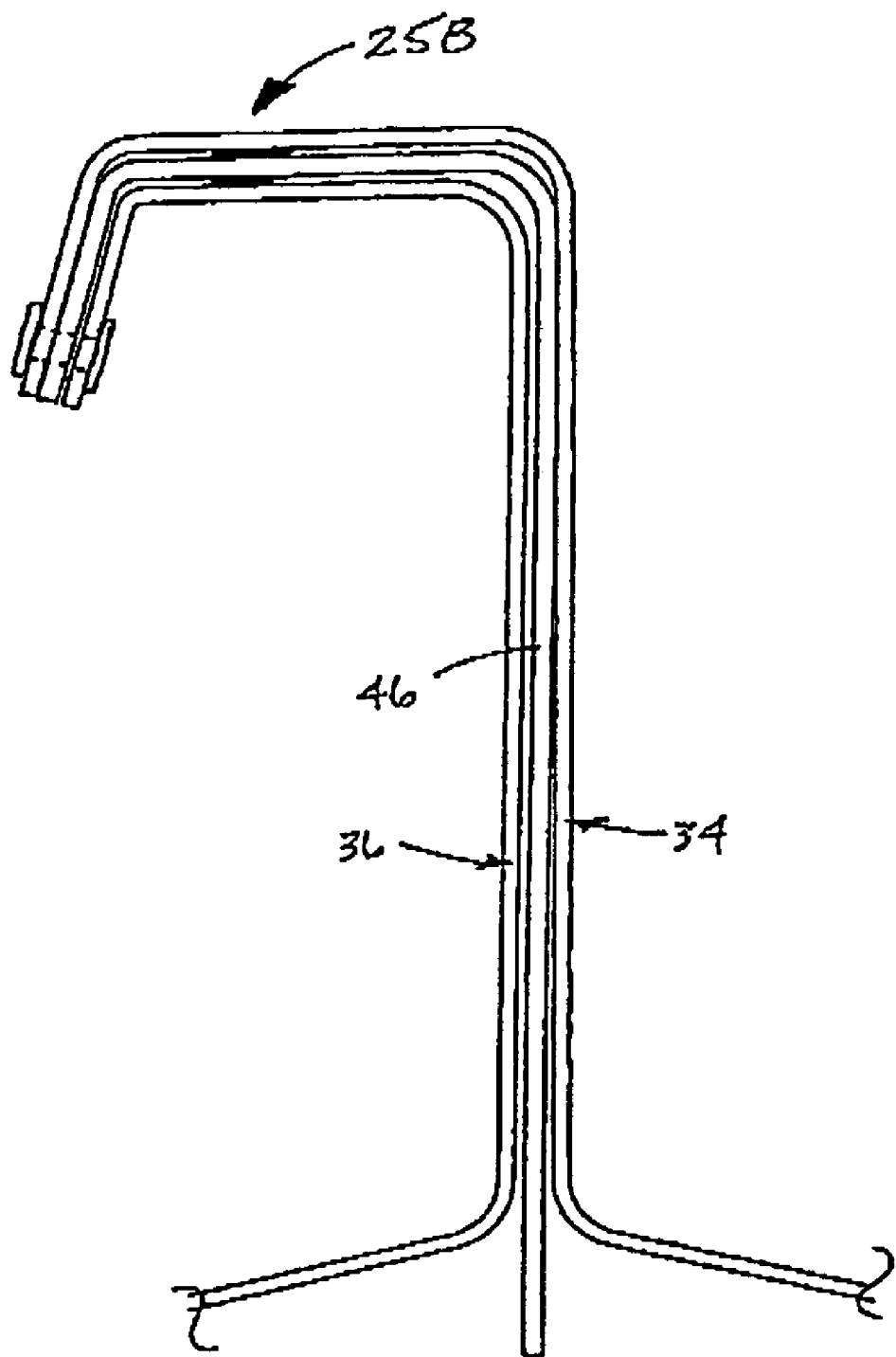
FIG. 47 is an end view of yet another alternative standing seam with a clip tab between the male and female corrugation with a fastener inserted through the male and female seam.

FIG. 47 is an end view of yet another alternative standing seam with a clip tab between the male and female male sidelap portions, and having a fastener inserted through the male and female sidelap portions. With this configuration, the seam and clip tab prevent in plane shear movement between all three elements. The fastener also increases the panels resistance to unfurling when subject to uplift forces. The fastener is located outside (outboard) of the sealants so water tightness of the seam is not impaired, and is applied through the last element to make the fastener easy to apply.

Figure 48:
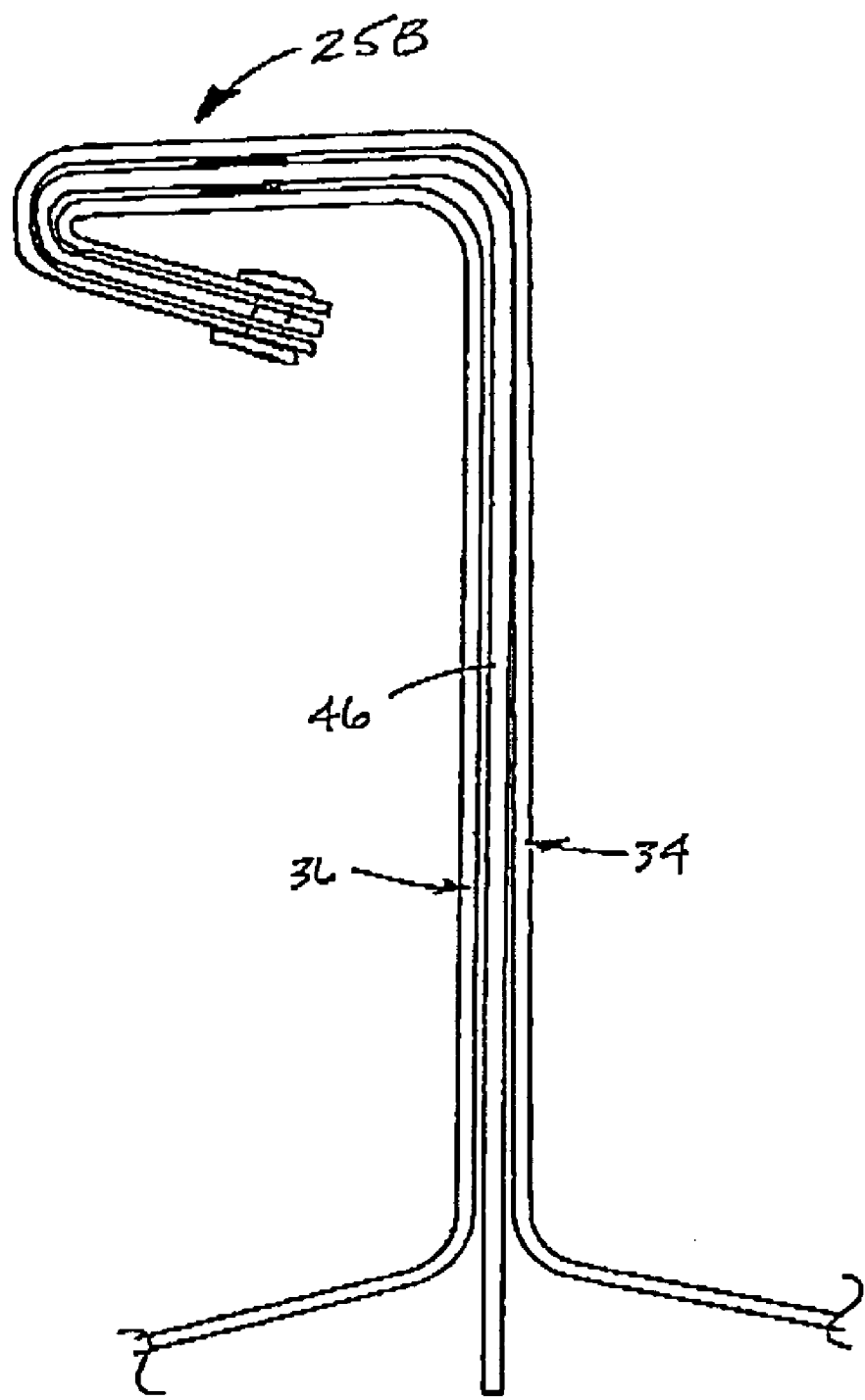
FIG. 48 is an end view of the standing seam of FIG. 47 after the corrugation has been seamed to tighten the seam and hide and protect the fastener.

FIG. 48 is an end view of the standing seam of FIG. 47 after the corrugation has been seamed to tighten the seam and hide and protect the fastener.

Figure 49:
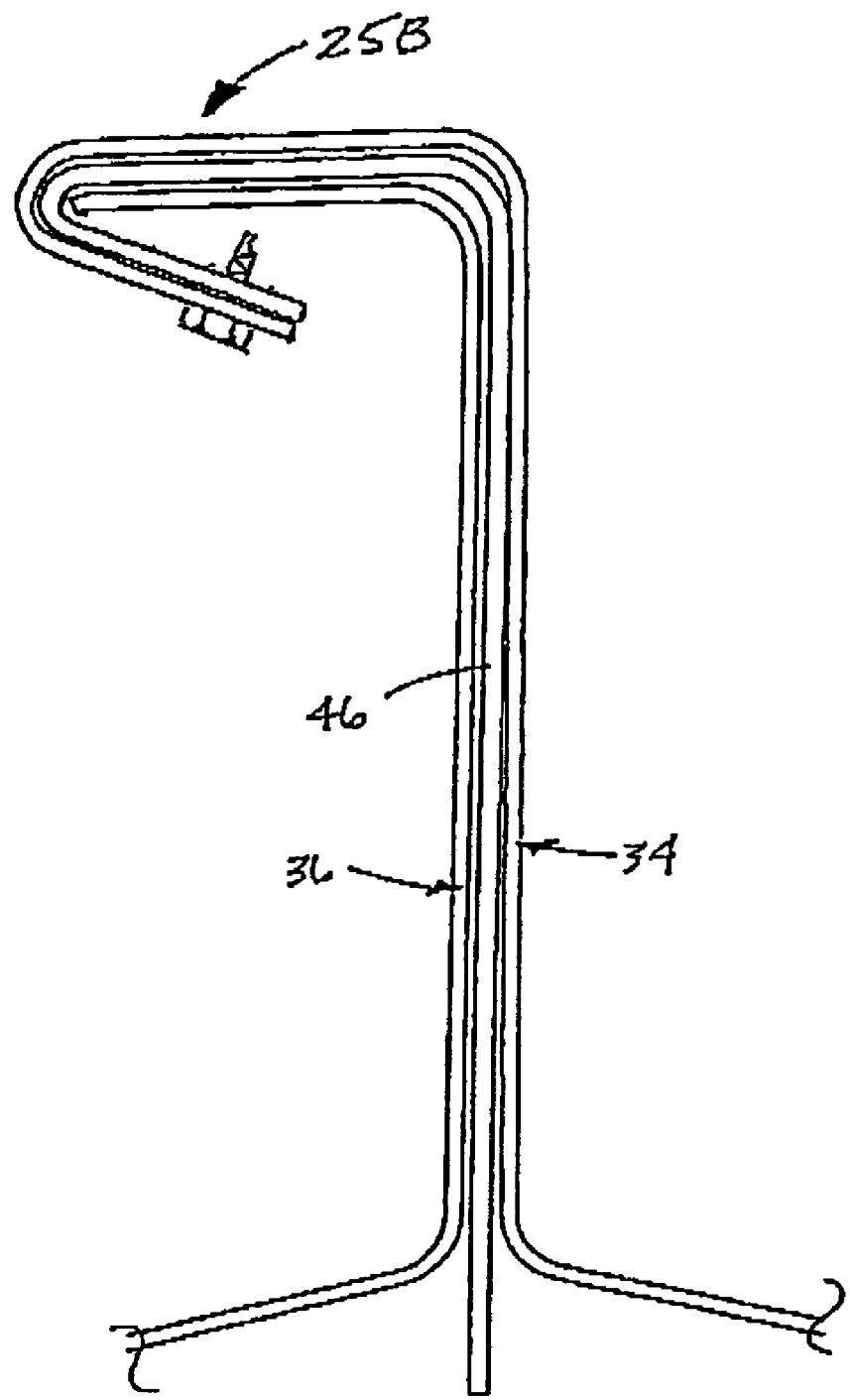
FIG. 49 is an end view of an alternative standing seam with a fastener.

FIG. 49 is an end view of an alternative standing seam with a fastener attacking any two of the three elements (the male and female sidelap portions and the clip) to increase in plane shear resistance between any two of the elements as required and to increase resistance to unfurling.

It is clear that the present invention is well adapted to carry out the objects and to attain the ends and advantages mentioned as well as those inherent therein. While presently preferred embodiments of the invention have been described for purposes of this disclosure, numerous changes may be made which will readily suggest themselves to those skilled in the art and which are encompassed within the spirit of the invention disclosed and as defined in the appended claims.

What is claimed is:

1. An assembly in which adjacent panels are supported by underlying support structure in overlapping edge relationship to form a standing seam assembly with a sidelap shear capacity resistant to side slipping when subjected to applied forces, the assembly comprising:

a first panel having a female sidelap portion comprising a female cavity and a downwardly angled leg with hook portion adjacent said cavity;

a second panel comprising a male sidelap portion having a tang portion extending from a fifth leg portion lockingly disposed in the female cavity of the first panel, said downwardly angled leg with hook portion in conjunction with said tang portion providing a standing seam between the first and second panels formed by pressing said downwardly angled leg with hook portion into mating contact with said tang portion and folding said mated downwardly angled leg with hook and tang portions into adjacency with said fifth leg portion, the female sidelap portion further forming a first leg portion, said assembly with the sidelap shear capacity formed by downwardly forming the standing seam to create an acute angle with respect to said first leg portion; and means for increasing the sidelap shear capacity of the standing seam assembly.

2. The assembly of claim 1, in which the means for increasing sidelap shear capacity of the assembly comprises:
at least one pair of plates, one against each of the female sidelap portion and the male sidelap portion of the first and second panels, respectively; and
fastening means interconnecting the pair of backer plates for exerting a pressing force against and sandwich the female sidelap and male sidelap in the standing seam.

3. The assembly of claim 1, in which the means for increasing sidelap shear capacity of the assembly comprises:
a cinch plate disposed on one of the first and second panels;
a backer plate extending under the first and second panels; and
fastener means extending through the cinch plate, the selected panel, and the backer plate to secure and sandwich the panel between the backer plate and the cinch plate.

4. The assembly of claim 1 wherein the standing seam assembly is metallic.

5. The standing seam assembly of claim 1 wherein the means for increasing sidelap shear capacity of the assembly comprises a roof clip in pressing contact adjacent a first side of a tang member of the male sidelap portion of the second panel, the roof clip enclosing the distal end of the tang member while looping back into adjacency with a second side of the tang member to enclose a portion of the tang member.

6. The assembly of claim 1, in which the means for increasing sidelap shear capacity of the assembly comprises:
a plate communicating with the female sidelap portion of said interlocked first and second panels; and
fastening means exerting a pressing force on the male sidelap portion of said interlocked first and second panels for interconnecting and sandwiching together the plate, the female sidelap portion, and male sidelap portion.

7. The assembly of claim 1, in which the means for increasing sidelap shear capacity of the assembly comprises:
a plate communicating with the male sidelap portion of said interlocked first and second panels; and
fastening means exerting a pressing force on the female sidelap portion of said interlocked first and second panels for interconnecting and sandwiching together the plate, the female sidelap portion, and male sidelap portion.

8. The assembly of claim 1, in which the means for increasing sidelap shear capacity of the assembly comprises:
a backer plate extending under said interlocked first and second panels; and
fastener means extending through said interlocked first and second panels for interconnecting and sandwiching together said fastener means, said interlocked first and second panels, and said backer plate.

9. The assembly of claim 1, in which downwardly forming the standing seam to create an acute angle with respect to the first leg portion increases the frictional force between said panels to provide the standing seam assembly with sidelap shear capacity.

10. A standing seam roof assembly in which adjacent roof panels are supported by underlying support structure in overlapping edge relationship to form a standing seam assembly with a sidelap shear capacity resistant to side slipping when subjected to applied wind forces, the standing seam roof assembly comprising:
a first roof panel comprising a female sidelap portion which forms a male insertion cavity and a downwardly angled leg with hook portion adjacent said male insertion cavity;
a second roof panel comprising a male sidelap portion having a tang portion extending from a fifth leg portion receivingly lockingly disposed in the male insertion cavity, said downwardly angled leg with hook portion in conjunction with said tang portion providing a standing seam between said first and second panels formed by pressing said downwardly angled leg with hook portion into mating contact with said tang portion and folding said mated leg with hook and tang portions into adjacency with said fifth leg portion, the female sidelap portion further forming a first leg portion, said standing seam assembly with the sidelap shear capacity formed by downwardly forming the standing seam to create an acute angle with respect to the first leg portion; and
means for increasing the sidelap shear capacity of the standing seam assembly.

11. The standing seam roof assembly of claim 10 wherein the means for increasing sidelap shear capacity comprises:
a plurality of backer plates disposed against the female sidelap portion and the male sidelap portion on opposing sides thereof; and
fastening means interconnecting said opposing backer plates and sandwiching the female sidelap and male sidelap in pressing engagement to increase sidelap shear capacity of the standing seam to slipping.

12. The standing seam roof assembly of claim 10 wherein the means for increasing sidelap shear capacity comprises:
a backer plate extending under the roof panels; and
fastener means connecting the backer plate and the roof panel.

13. A standing seam roof assembly with sidelap shear capacity resistant to side slipping comprising:
a first panel having a female sidelap portion comprising a first leg portion, a female cavity, and a downwardly angled leg with hook adjacent said female cavity;
a second panel interacting with said female cavity, said second panel comprising a male sidelap portion having a fifth leg portion with a tang extending therefrom, said angled leg with hook in combination with said tang providing a standing seam between said panels formed by pressing said angled leg with hook into mating contact with said tang and folding said mated leg with hook and tang into adjacency with said fifth leg portion, the standing seam roof assembly with sidelap shear capacity formed by downwardly forming the standing seam to create an acute angle with respect to the first leg portion; and
means for increasing the sidelap shear capacity of the standing seam assembly.

14. The standing seam roof assembly of claim 13 wherein the means for increasing sidelap shear capacity of the adjacent roof panels comprises:
at least one pair of backer plates disposed on opposing sides of the standing seam and against the female sidelap portion and the male sidelap portion of the first and second roof panels; and fastening means interconnecting the backer plates for sandwiching the female sidelap and male sidelap in the standing seam to increase the frictional force there between.

15. The standing seam roof assembly of claim 13 wherein the means for increasing sidelap shear capacity of the adjacent roof panels comprises:
   a cinch plate disposed on one of the first and second roof panels;
   a backer plate extending under the first and second roof panels; and
   fastener means extending through the supporting roof panel for interconnecting the cinch plate and the backer plate to sandwich the supporting roof panel to the backer plate.

16. A roof having adjacently disposed panels supported by underlying support structure in overlapping edge relationship to form standing seam assemblies each with a sidelap shear capacity between adjacent roof panels, comprising:
   each roof panel comprising a female sidelap portion with a first leg portion, a male insertion cavity, and a downwardly angled leg with hook adjacent said male insertion cavity;
   each roof panel further comprising a male sidelap portion having a fifth leg portion with a tang extending therefrom forming a male insertion portion lockingly engageable in the male insertion cavity of the roof panel adjacent thereto, wherein the male sidelap portion is inserted into the male insertion cavity, said angled leg with hook in combination with said tang providing a standing seam between said panels formed by pressing said angled leg with hook into mating contact with said tang and folding said mated leg with hook and tang into adjacency with said fifth leg portion, each standing seam assembly with sidelap shear capacity formed by downwardly forming the standing seam to create an acute angle with respect to the first leg portion; and
   means for increasing the sidelap shear capacity of the standing seam assembly.

17. The standing seam roof assembly of claim 16 wherein the means for increasing sidelap shear capacity of each standing seam assembly comprises:
   a plurality of backer plates disposed on opposing sides of each standing seam assembly and against the female sidelap portions and the male sidelap portions of the panels; and
   fastening means connecting pairs of the backer plates for sandwiching the standing seams to exert friction increasing pressure on the standing seams to resist slipping thereof when subjected to diaphragm loading.

18. The standing seam roof assembly of claim 16 wherein the means for increasing sidelap shear capacity of each standing seam assembly comprises:
   a cinch plate supported on one of the roof panels between the standing seams;
   at least one backer member extending under the panels; and
   fastener means extending through the supporting roof panels interconnecting the cinch plates and the backer plates to sandwich the roof panels between the cinch plates and the backer plate.

19. A method for forming a standing seam assembly with sidelap shear capacity by steps comprising:
   providing a first roof panel and a second roof panel adjacent the first roof panel;
   interlocking a female sidelap portion of the first panel with a male portion of the second panel, the female sidelap portion having a first leg portion;
   forming a downwardly angled leg with hook portion of the female sidelap portion;
   jointly forming a fifth leg portion with a tang extending therefrom of the male sidelap portion;
   pressing the downwardly angled leg with hook portion into mating contact with the tang extending from the fifth leg portion and folding the resulting mated leg with hook and tang into adjacency with said fifth leg portion to form a standing seam; and
   downwardly forming the standing seam to create an acute angle with respect to the first leg portion of the female sidelap portion to form the standing seam assembly with sidelap shear capacity.

20. A combination comprising:
   a standing seam assembly with a sidelap shear capacity provided by steps for forming a standing seam assembly with sidelap shear capacity; and
   means for increasing the sidelap shear capacity of the standing seam assembly.

21. An assembly in which adjacent panels in overlapping edge relationship form a standing seam assembly with a sidelap shear capacity resistant to side slipping when subjected to applied forces, the assembly comprising:
   a first panel having a female sidelap portion comprising a female cavity and a downwardly angled leg with hook portion adjacent said cavity; and
   a second panel interacting with said female cavity, said second panel comprising a male sidelap portion having a fifth leg portion with a tang extending therefrom, said angled leg with hook in combination with said tang providing a standing seam between said panels formed by pressing said angled leg with hook into mating contact with said tang and folding said mated leg with hook and tang into adjacency with said fifth leg portion, the standing seam assembly with sidelap shear capacity formed by downwardly forming the standing seam to create an acute angle with respect to the first leg portion, in which downwardly forming the standing seam to create an acute angle with respect to the first leg portion increases the frictional resistance between said panels to provide the standing seam assembly with sidelap shear capacity, thereby increasing a diaphragm strength of said assembly.

* * * * *